US011965981B2

(12) United States Patent
Ohta et al.

(10) Patent No.: US 11,965,981 B2
(45) Date of Patent: Apr. 23, 2024

(54) LIGHT-SOURCE DEVICE, DETECTION DEVICE, AND ELECTRONIC APPARATUS

(71) Applicant: Ricoh Company, Ltd., Tokyo (JP)

(72) Inventors: Yusuke Ohta, Kanagawa (JP); Takumi Satoh, Miyagi (JP)

(73) Assignee: RICOH COMPANY, LTD., Tokyo (JP)

( * ) Notice: Subject to any disclaimer, the term of this patent is extended or adjusted under 35 U.S.C. 154(b) by 529 days.

(21) Appl. No.: 17/082,689

(22) Filed: Oct. 28, 2020

(65) Prior Publication Data
US 2021/0149023 A1 May 20, 2021

(30) Foreign Application Priority Data

Nov. 15, 2019 (JP) ................. 2019-206768

(51) Int. Cl.
G01S 7/481 (2006.01)
G01S 7/484 (2006.01)
G01S 17/10 (2020.01)
G02B 3/00 (2006.01)

(52) U.S. Cl.
CPC ............ G01S 7/4814 (2013.01); G01S 7/484 (2013.01); G01S 17/10 (2013.01); G02B 3/0056 (2013.01)

(58) Field of Classification Search
CPC ........ G01S 7/4814; G01S 7/484; G01S 17/10; G02B 3/0056
See application file for complete search history.

(56) References Cited

U.S. PATENT DOCUMENTS

| 2004/0130790 | A1* | 7/2004 | Sales | G02B 27/0961 |
| | | | | 359/619 |
| 2010/0046953 | A1* | 2/2010 | Shaw | H01S 5/423 |
| | | | | 398/115 |
| 2013/0222865 | A1* | 8/2013 | Iwamatsu | G02B 6/0043 |
| | | | | 358/484 |
| 2017/0286743 | A1* | 10/2017 | Lee | G06V 40/1318 |
| 2018/0335682 | A1 | 11/2018 | Satoh et al. | |
| 2019/0011567 | A1* | 1/2019 | Pacala | G01S 7/4863 |
| 2019/0025430 | A1* | 1/2019 | Rohani | G01S 17/89 |
| 2019/0280454 | A1 | 9/2019 | Ikeoh et al. | |
| 2020/0150418 | A1 | 5/2020 | Satoh et al. | |

(Continued)

FOREIGN PATENT DOCUMENTS

| JP | H06-178051 A | 6/1994 |
| JP | 2002-120230 A | 4/2002 |
| JP | 2008-168118 A | 7/2008 |

(Continued)

OTHER PUBLICATIONS

Office Action dated Jun. 20, 2023 in Japanese Patent Application No. 2019-206768, 8 pages.

Primary Examiner — Isam A Alsomiri
Assistant Examiner — Joseph C Fritchman
(74) Attorney, Agent, or Firm — XSENSUS LLP

(57) ABSTRACT

A light-source device includes a plurality of light emitters; and a plurality of optical elements through which laser beams emitted from the plurality of light emitters pass. The plurality of optical elements includes: a first optical element configured to emit a laser beam of a first divergence angle; and a second optical element configured to emit a laser beam of a second divergence angle smaller than the first divergence angle.

17 Claims, 22 Drawing Sheets

(56) References Cited

U.S. PATENT DOCUMENTS

2020/0303896 A1   9/2020   Ohta et al.

FOREIGN PATENT DOCUMENTS

| JP | 2017-216285 A | 12/2017 |
| JP | 2019-144072 A | 8/2019 |
| WO | WO2013/121267 A1 | 8/2013 |
| WO | WO2014/175901 A1 | 10/2014 |

* cited by examiner

FIG. 4
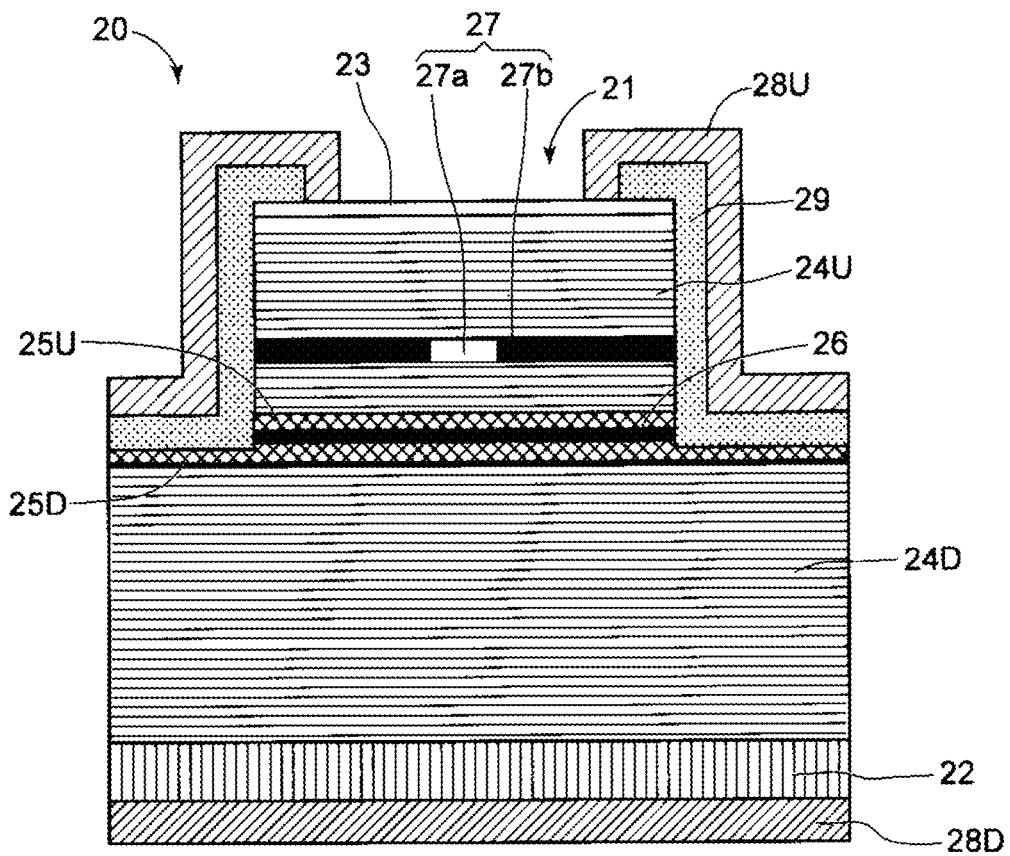
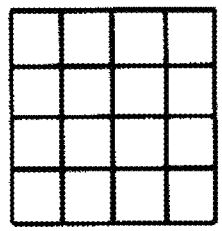
FIG. 5A
REGULAR IMAGE SURFACE
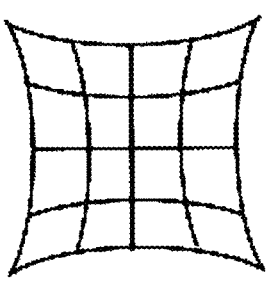
FIG. 5B
PINCUSHION DISTORTION
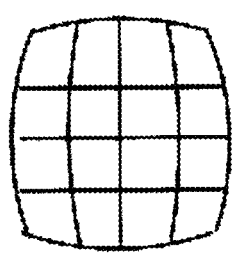
FIG. 5C
BARREL DISTORTION

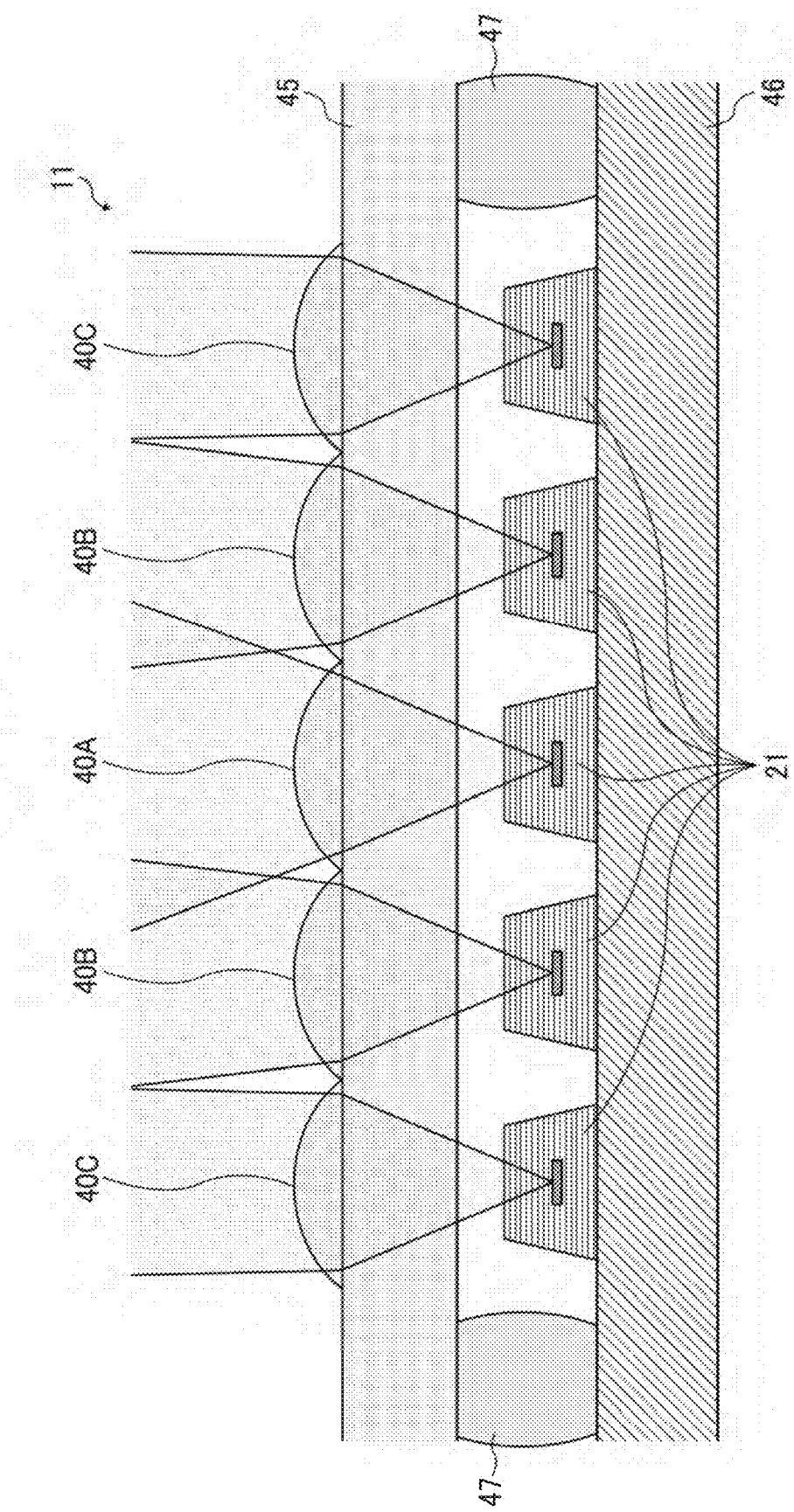

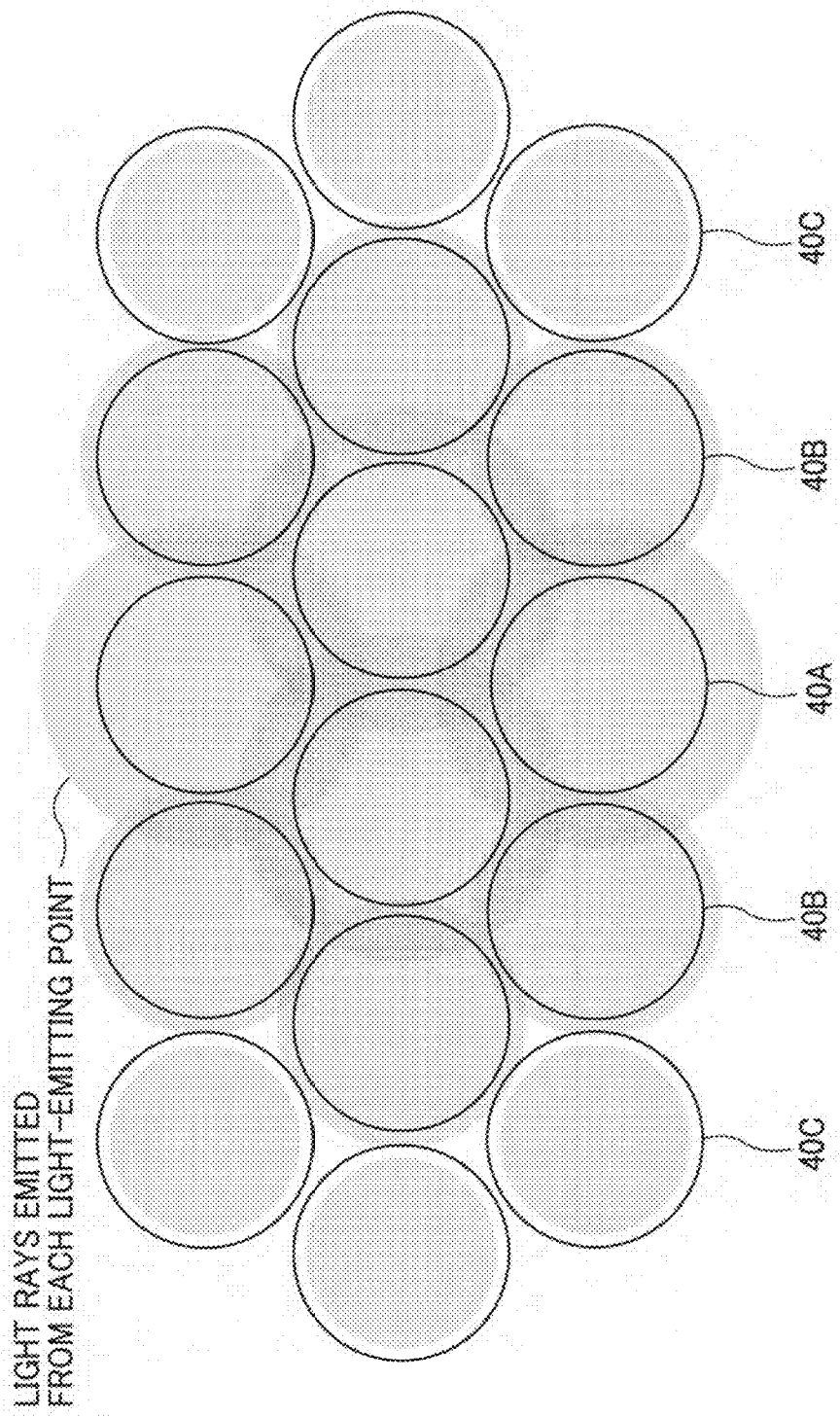

LIGHT-SOURCE DEVICE, DETECTION DEVICE, AND ELECTRONIC APPARATUS

CROSS-REFERENCE TO RELATED APPLICATIONS

This patent application is based on and claims priority pursuant to 35 U.S.C. 119(a) to Japanese Patent Application No. 2019-206768, filed on Nov. 15, 2019, in the Japan Patent Office, the entire disclosure of which is hereby incorporated by reference herein.

BACKGROUND

Technical Field

Embodiments of the present disclosure relate to a light-source device, a detection device, and an electronic apparatus.

Related Art

In recent years, light detection and ranging (LIDAR) devices have been greatly developed, and three-dimensional (3D) sensors are drawing attentions as an example of the LIDAR devices. Such 3D sensors employ the time-of-flight (TOF) method that obtains a time difference between the timing of emitting pulsed light and the liming of receiving light reflected from a target object so as to measure a distance to the target object based on the time difference. As an illumination system that emits pulsed light, there are known light emitting diodes (LEDs), laser diodes (LDs), and optical systems incorporating such an LED or LD and a diffusion plate or a diffraction grating, for example.

SUMMARY

In one aspect of this disclosure, there is described a light-source device including a plurality of light emitters; and a plurality of optical elements through which laser beams emitted from the plurality of light emitters pass. The plurality of optical elements includes: a first optical element configured to emit a laser beam of a first divergence angle, and a second optical element configured to emit a laser beam of a second divergence angle smaller than the first divergence angle.

In another aspect of this disclosure, there is disclosed a detection device including the light-source device; and a sensor configured to detect light that has been emitted from the light-source device and reflected from an object.

In even another aspect of this disclosure, there is disclosed an electronic apparatus including the detection device, and circuitry configured to control the electronic apparatus based on the information output from the detection device.

BRIEF DESCRIPTION OF THE SEVERAL VIEWS OF THE DRAWINGS

The aforementioned and other aspects, features, and advantages of the present disclosure would be better understood by reference to the following detailed description when considered in connection with the accompanying drawings, wherein:

FIG. 4 is a cross-sectional view of a part of the light source of the light-source device in FIG. 1;

FIGS. 5A, 5B, and 5C are illustrations of distortion aberrations of the projection optical system for describing variations in irradiation intensity due to the distortion aberration, FIG. 5A illustrating a typical image plane, FIG. 5B illustrating pincushion distortion, and FIG. 5C illustrating barrel distortion;

FIGS. 7A and 7B are illustrations of a plurality of microlenses with optical surfaces having different shapes, from which laser beams with different divergence angles are emitted, according to an embodiment of the present disclosure;

Figure 1:
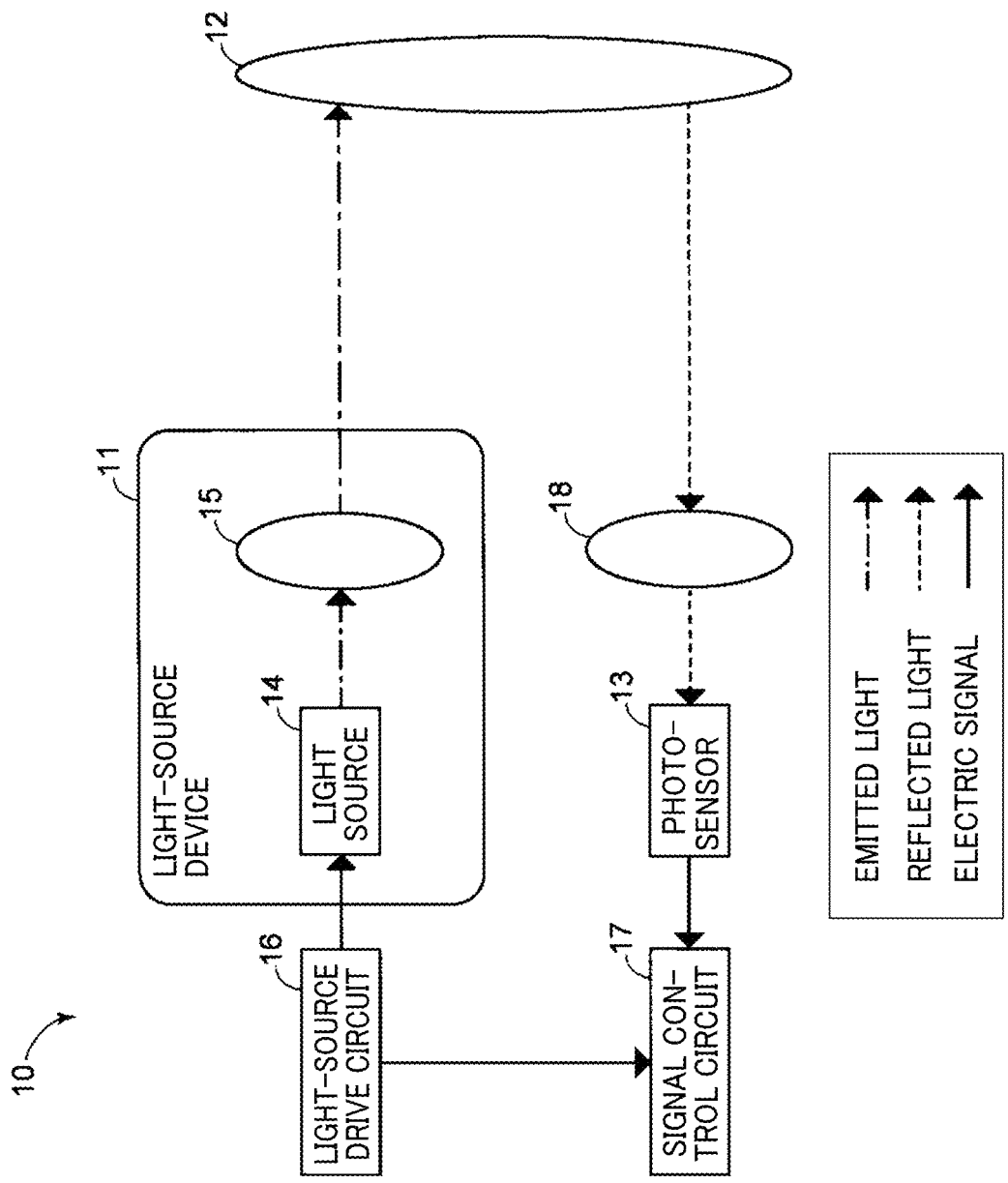
FIG. 1 is an illustration of an example of a range finder as a detection device incorporating a light-source device according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

The inventors of the present invention have found through studies that the uniformity of illuminance on the irradiated surface of the detection target is relevant to accuracy of distance measurement by 3D sensing. Specifically, it was found that as the illuminance of the irradiated surface of the detection target is more uniform, the intensity of light reflected from the detection target increases, which improves the accuracy of distance measurement.

In the illumination system (the LED and the LD) of a LIDAR device (the LIDAR system) according to a comparative example, however, a projection optical system diverges light emitted from a light source to have a wider range of the detection target irradiated with the light (with a wider angle). In this configuration the illuminance across the irradiated surface of the detection target becomes nonuniform due to aberration of the projection optical system. In other words, the illumination system according to a comparative example might cause an unevenness in intensity over the irradiated surface, which degrades the accuracy of distance measurement.

The embodiments of the present disclosure provide a light-source device that increases uniformity of irradiation light so as to achieve a higher accuracy of detection; a detection device incorporating the light-source device; and an electronic apparatus incorporating the detection device.

An embodiment to which the present disclosure is applied is described below referring to the drawings. FIG. 1 is an illustration of a configuration of a range finder 10 as a detection device. In FIG. 1, solid-line arrows indicate the flow of electric signals, broken line arrows indicate the path of reflected light, and dashed-line arrows indicate the path of light emitted from a light-source device 11.

In the range finder 10, the light-source device 11 projects (emits) pulsed light to an object 12 to be detected, and a photosensor 13 receives light reflected from the object 12. Thus, the range finder 10 obtains a distance to the object 12 based on time it has taken to receive the reflected light. In other words, the range finder 10 employs time-of-flight (TOF) method to detect a distance to an object to be detected.

The light-source device 11 includes a light source 14 and a projection optical system 15. Light emission of the light source 14 is controlled in accordance with an electric signal (electric current) from a light-source drive circuit 16. The light-source drive circuit 16 transmits a signal to a signal control circuit 17 when the light source 14 is controlled to emit light. The projection optical system 15 diverges light emitted from the light source 14 and projects the diverged light to the object 12 to be detected.

The light that has been projected from the light-source device 11 and reflected by the object 12 is guided to the photosensor 13 through a light receiving optical system 18 that has a light focusing effect. The photosensor 13 includes a photoelectric conversion element. The light that has been received by the photosensor 13 is photoelectrically converted by the photoelectric conversion element, and the photoelectrically-converted light is sent to the signal control circuit 17 as an electrical signal. The signal control circuit 17 calculates the distance to the object 12 based on the time difference between the timing of light projection (i.e., the timing at which a light emission signal is input from the light-source drive circuit 16) and the timing of light reception (i.e., the timing at which a light reception signal is input from the photosensor 13). In the range finder 10, the photosensor 13 serves as a sensor configured to detect light that has been emitted from the light-source device 11 and reflected by the object 12. The signal control circuit 17 serves as a calculator to obtain information about a distance to the object 12 based on the signal output from the photosensor 13 (sensor).

As an example of an illumination optical system of TOF sensors in 3D sensing technology, there is a system that scans an irradiated area with light emitted from a light source, being deflected by an optical scanner, e.g., micro electro mechanical systems (MEMS) and a drive mirror. Such a system, however, might reduce an image acquisition rate, i.e., frames per second (fps) depending on a scanning rate (moving speed). The present embodiment adopts a flash optical system to deal with such an issue. In the flash optical system, the projection optical system 15 collectively emits the light emitted horn the light source 14 while diverging the light so that an irradiated area as a whole is irradiated with the light.

Figure 2A:
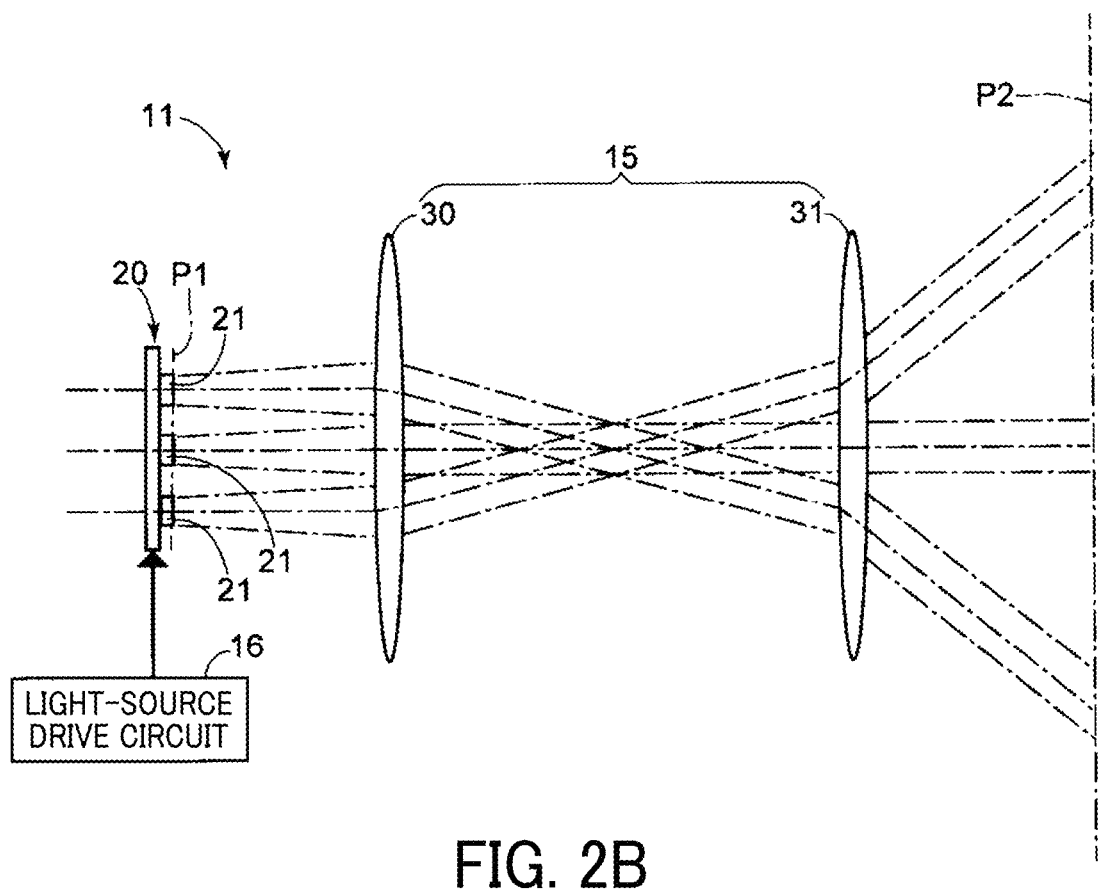
FIGS. 2A and 2B are illustrations of the reference state of a projection optical system of the light-source device, FIG. 2A illustrating a configuration of the light-source device and FIG. 2B illustrating an irradiated state of a surface irradiated with light emitted from the light-source device.
Figure 3A:
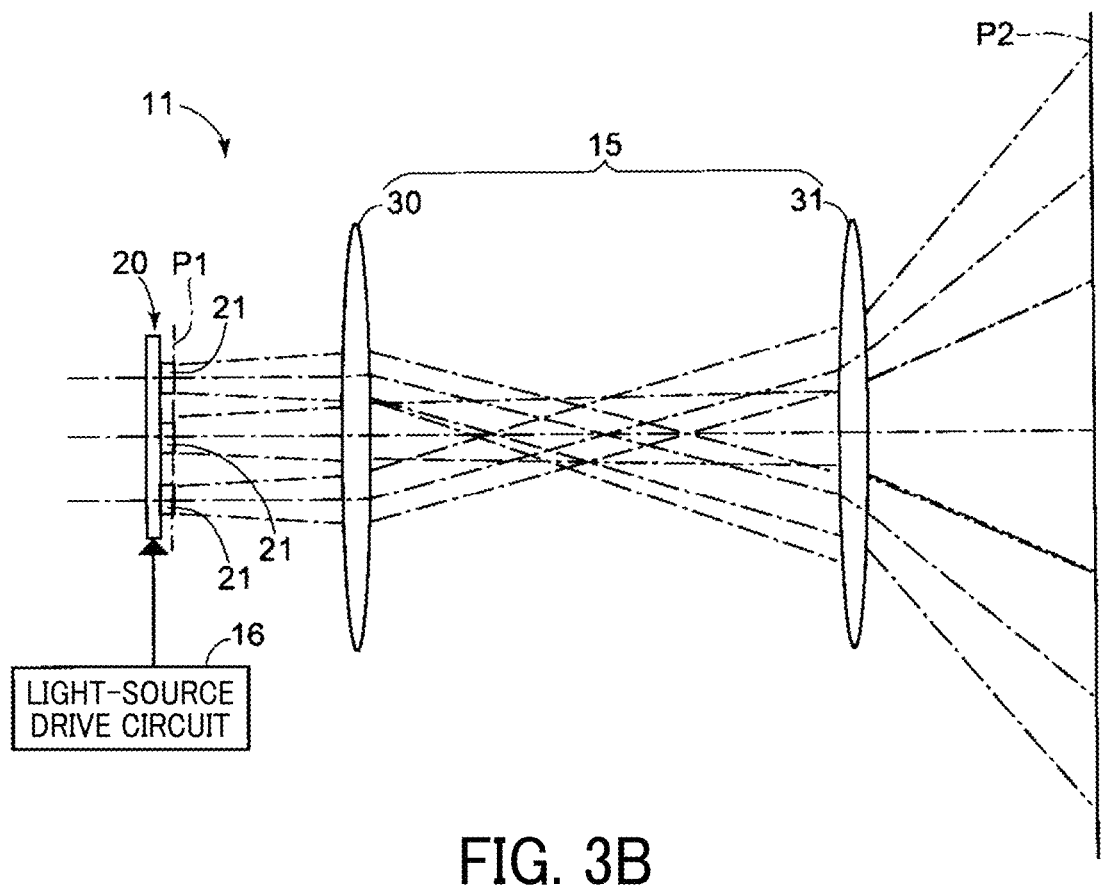
FIGS. 3A and 3B are illustrations of an irradiated area for which the projection optical system is adjusted in the light-source device, FIG. 3A illustrating a configuration of the light-source device and FIG. 3B illustrating the irradiated area on an irradiated surface that is irradiated with light emitted from the light-source device.

FIGS. 2A and 3A are illustrations of the configuration of the light-source device 11. The light-source device 11 is provided with a surface-emitting laser 20 as the light source 14 in FIG. 1. The surface-emitting laser 20 includes a plurality of surface-emitting laser elements 21 as light emitters arranged in specified relative positions to each other on a light-emitting surface P1. In the present embodiment, the surface-emitting laser 20 is an example of a light source, and the surface-emitting laser element 21 is an example of a light emitter. The surface-emitting laser elements 21 according to the present embodiment is a vertical-cavity surface-emitting lasers (VCSEL) that emits light in a direction vertical to a substrate.

FIG. 4 is a cross-sectional view of a part of the surface-emitting laser 20 corresponding to each of the surface-emitting laser elements 21. As illustrated in FIG. 4, a lower multilayer reflecting mirror 24D, a lower spacer layer 25D, an active layer 26, an upper spacer layer 25U, an upper multilayer reflecting mirror 24U, and a contact layer 23 are stacked on a substrate 22. A current confinement layer 27 is formed in the upper multilayer reflecting mirror 24U. The current confinement layer 27 includes a current passing area 27a and a current blocking area 27b enclosing the current passing area 27a. A lower electrode 28D is disposed under the base 22, and an upper electrode 28U is disposed on the upper most part. An insulator 29 is disposed to insulate the inner side of the upper electrode 28U. The upper electrode 28U contacts the outer peripheral surface of the contact layer 23, and the central portion of the contact layer 23 is open.

When a current is applied from the upper and lower electrodes 28U and 28D to the active layer 26, a laser beam oscillates after being amplified in the upper multilayer reflecting mirror 24U and the lower multilayer reflecting mirror 24D of the multilayered structure. The emission intensity of the laser beam changes with the applied current. The current confinement layer 27 enhances the efficiency of applying current to the active layer 26 to reduce a oscillation threshold. As the current passing area 27a of the current confinement layer 27 increases, a maximum current to be applied increases, which increases a maximum output power of an oscillable laser beam. This, however, increases the oscillation threshold.

The two-dimensional arrangement of the light emitters is more easily achieved by the VCSEL than an end-surface emitting laser. Further, the VCSEL provides a multipoint laser in which light emitters are densely arranged. Still further, the VCSEL has a higher degree of flexibility in layout of a plurality of light emitters, and the light emitters may be arranged at any desired positions on the substrate. As the VCSEL achieves a higher output power, for example, by arranging as many light emitters as possible, the VCSEL is suitable for a light source of the TOF sensor.

As illustrated in FIGS. 2A and 3A, the projection optical system 15 includes a condenser lens 30 as a focusing optical element and a projector lens 31 as a magnifying optical element. The condenser lens 30 has positive power to reduce a divergence angle of a laser beam emitted from each of the surface-emitting laser elements 21 of the surface-emitting laser 20 so as to form a conjugate image of each of the surface-emitting laser elements 21. The projector lens 31 has negative power to diverge a bundle of laser beams that has passed through the condenser lens 30 so as to project the bundle of laser beams onto an irradiated area wider than the light-emitting surface P1 of the surface-emitting laser 20. The range of the irradiated area and the scale of the conjugate image are determined by the curvature of the surface of the projector lens 31.

The configuration of the projection optical system according to an embodiment of the present disclosure is not limited to the examples in FIGS. 2A and 3A. The focusing optical element constituting the projection optical system 15 may be any element as long as it reduces the divergence angle of light from the light source (the surface-emitting laser 20). Examples of the projection optical system 15 may include a diffraction grating instead of a lens. When a lens is used as the focusing optical element, the lens may be shared to allow a plurality of laser beams emitted from the surface-emitting laser elements 21 to pass therethrough. Alternatively, a microlens array in which a plurality of lenses are arranged corresponding to the surface-emitting laser elements 21, respectively, may be used. The magnifying optical element of the projection optical system 15 may be any desired element as long as it diverges light and may be, for example, a biconcave lens, a negative meniscus lens, or a diffusing plate. When a lens is used for any one of the focusing optical element and the magnifying optical element, the number of lenses arranged in the direction of the optical axis may be one or more. When such a plurality of lenses constitutes a lens group.

In the light-source device 11 as illustrated in FIG. 2A, the focal length of the condenser lens 10 is equal to the distance between the light-emitting surface P1 of the surface-emitting laser 20 and the condenser lens 30. Such a state is referred to as the reference state of the light-source device 11 and the projection optical system 15. In the reference state of the projection optical system 15, the laser beams emitted from the surface-emitting laser elements 21 of the surface-emitting laser 20 are collimated by the condenser lens 30 before passing through the condenser lens 30. A conjugate image of each of the surface-emitting laser elements 21 is formed at any position in the optical path of the laser beams that has passed through the condenser lens 10. In other words, the light-emitting surface P1, the light emitting surface P1 and the irradiated surface P2 have a substantially conjugate relation. The irradiated surface P2 is a virtual plane set to facilitate understanding of the optical state, and the actual object 12 to be detected is not limited to a plane and has various shapes.

Figure 2B:
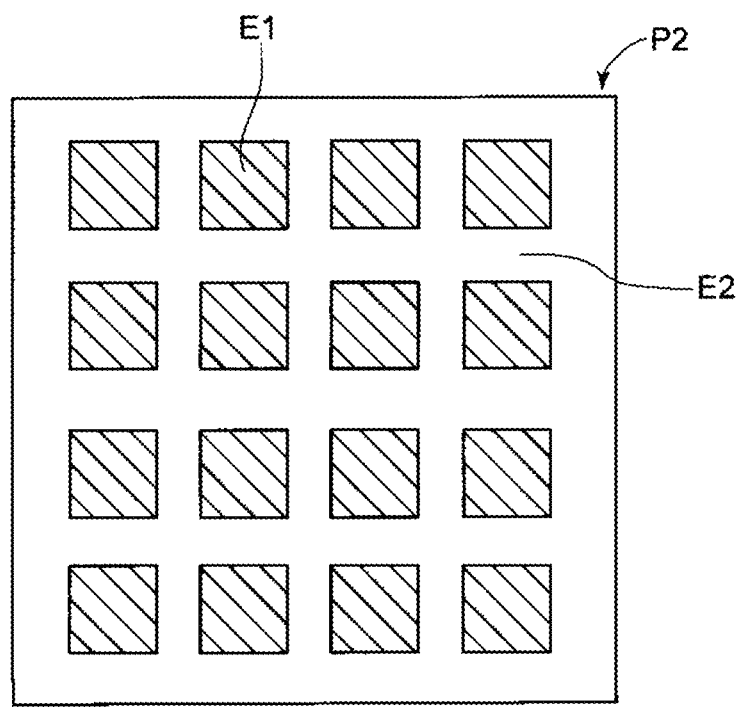

FIG. 2B is an illustration of an irradiated area on the irradiated surface P2 in the reference state of the projection optical system 15. The plurality of surface-emitting laser elements 21 are spaced apart from each other on the surface-emitting laser 20, and irradiated areas E1 appear on the irradiated surface P2 such that the irradiated areas E1 are separated from each other (spaced from each other) in the reference state at which a conjugate image of each of the surface-emitting laser elements 21 is formed. More specifically, each of the irradiation areas E1 is an area irradiated with light on the irradiated surface P2. The irradiated areas E1 are located corresponding to the plurality of surface-emitting laser elements 21 of the surface-emitting laser 20. On the irradiated surface P2, an unirradiated area E2 having a lower illuminance (without being irradiated with light) than the irradiated areas E1 is present between the irradiated areas E1. The unirradiated area E2 corresponds to space between the plurality of surface-emitting laser elements 21 of the surface-emitting laser 20. In other words, high-illuminance portions are discretely distributed on the irradiated surface P2 in the reference state of the projection optical system 15, which fails to provide an uniform illuminance over the irradiated surface.

In the light-source device 11 of FIG. 3A, the condenser lens 30 is slightly shifted from the reference state of the projection optical system 15 in FIG. 2A to the object side (closer to the light-emitting surface P1 side) along the direction of the optical axis. This slate is referred to as an irradiated-area adjusted state for which the projection optical system 15 is adjusted in the light-source device 11. In the irradiated-area adjusted state, the condenser lens 30 is shifted to diverge the light beams from the respective surface-emitting laser elements 21 without collimating the light beams. The conjugate image of each of the surface-emitting laser elements 21 is extended and bigger for the irradiated-area adjusted state than for the reference state. This configuration provides an overall irradiated area E3 on the irradiated surface P2 having the entire surface that is irradiated with light such that the area corresponding to the space between the surface-emitting laser elements 21 is also irradiated with light.

The degree to which the condenser lens 30 is shifted from the reference state to the irradiated-area adjusted state is variable with the specs and various conditions of the projection optical system 15 and the surface-emitting laser 20, The configuration of the present embodiment provides the overall irradiated area E3 that is irradiated with a laser beam with a wide angle and a uniform intensity by shifting the condenser lens 30 to the object side to be closer to the light-emitting surface P1 within the range of from 15% to 24% with respect to the distance from the light-emitting surface P1 of the surface-emitting laser 20 to the condenser lens 30 in the reference state, that is, the focal length of the condenser lens 30 in the reference state. If the degree of shift of the condenser lens 30 falls below the lower limit (15%) of the above-described range, the irradiated area to be irradiated on the irradiated surface P2 corresponding to each surface-emitting laser element 21 decreases, which would adversely create the unirradiated area E2 as illustrated FIG. 2B. If the degree of shift of the condenser lens 30 exceeds the upper limit (24%) of the above-described range, the incident angle of light incident on the projector lens 31 excessively increases, which causes aberrations to adversely affect the irradiated area of the irradiated surface P2, resulting in a failure of a uniform illuminance over the entire irradiated surface P2.

The degree (ratio) A [%] of shift of the condenser lens 30 is given by A=(a0−a1)/a0×100, where a0 denotes a distance between the light source and the position at which the condenser lens 30 forms a conjugate image (i.e., the focal length of the condenser lens 30), and a denotes a distance between the light source and the position to which the condenser lens 30 has been shifted.

To prevent the occurrence of the unirradiated area E2, the curvature of the surface of the projector lens 31 may be changed, instead of shifting the condenser lens 30 along the direction of the optical axis in the projection optical system 15. More specifically, the conjugate image of each surface-entitling laser element 21 is made incident on the projector lens 31, and the curvature of the surface of the projector lens 31 is set to enlarge the image of each surface-emitting laser element 21. In addition, a projector lens 31 suitable for obtaining an irradiated area (the overall irradiated area E3) without the unirradiated area E2 is selected. Such a method to prevent the occurrence of the unirradiated area E2 is achieved by merely replacing the projector lens 31 with another according to a desired irradiated area, without changing the combination of the surface-emitting laser 20 and the condenser lens 30 and the arrangement thereof. Such a method advantageously reduces work burden of setting and adjustment of the optical components.

In some examples, the method of shifting the condenser lens 30 along the direction of the optical axis may be combined with the method of changing the curvature of the surface of the projector lens 31 (replacing the projector lens 31 with another one) to adjust the irradiated area of the projection optical system 15.

In the range finder 10 of FIG. 1, the shape and arrangement of the photosensor 13 in FIG. 1 correspond to the irradiated area to be irradiated with light emitted from the light-source device 11. This arrangement maintains the correlation between light emitted from each surface-emitting laser element 21 of the surface-emitting laser 20 and light reflected by the object 12 and received by the photosensor 13, which enables an accurate detection (range finding) for an irradiated area corresponding to each surface-emitting laser element 21.

Figure 3B:
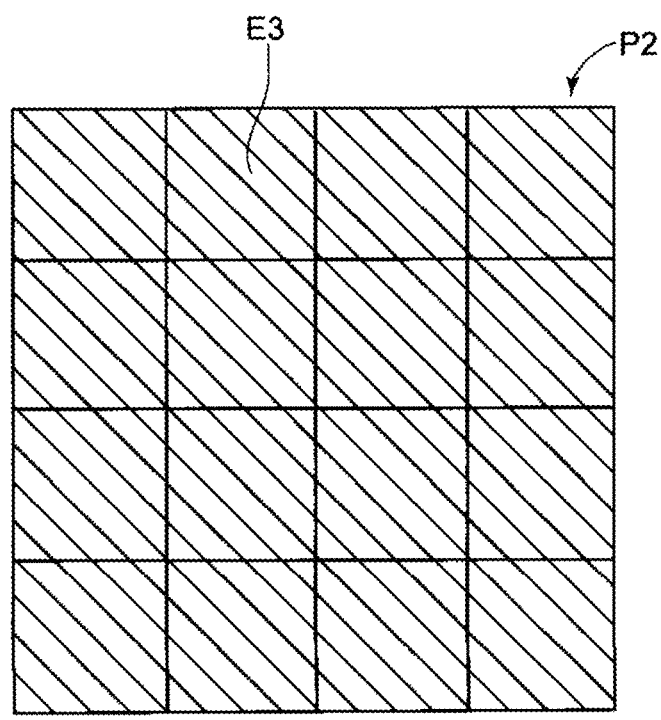

If the laser beams emitted from the surface-emitting laser elements 21 of the surface-emitting laser 20 are diverged by the projection optical system 15, distortion aberration occurs and the occurrence of distortion further distorts the image on the irradiated surface P2. This is because the magnification of the image varies with the irradiated area. Such a distortion of the image plane causes variations in illuminance on the irradiated surface P2 between the irradiated areas even when the overall irradiated areas E3 as illustrated in FIG. 3B is obtained. As the variations in illuminance is generated by the aberration of the projection optical system 15 itself that emits light while diverging it, such variations in illuminance might occur in both the reference state in FIG. 2A and the irradiated-area adjusted state in FIG. 3A.

Examples of the distortion aberration include a pincushion distortion aberration in which the central portion of the image contracts and the peripheral portion is stretched, and a barrel distort ion aberration in which the central portion of the image expands and the peripheral portion contracts. In the pincushion distortion aberration, as a surface-emitting laser element 21 is disposed closer to the peripheral portion of the light-emitting surface P1 of the surface-emitting laser 20, an image on the irradiated surface P2 is distorted (stretched) more significantly, and the illuminance (irradiation intensity) per unit area decreases. For the barrel distortion aberration, a surface-emitting laser element 21 is disposed closer to the center of the light-emitting surface P1 of the surface-emitting laser 20, an image on the irradiated surface P2 is distorted (stretched) more significantly, and the illuminance (irradiation intensity) per unit area decreases.

FIGS. 5A, 5B, and 5C are illustrations of distortion aberrations of the projection optical system 15 for describing variations in irradiation intensity due to distortion aberration, FIG. 5A illustrating a typical image plane, FIG. 5B illustrating pincushion distortion, and FIG. 5C illustrating barrel distortion.

To avoid the occurrence of the variations in illuminance (irradiation intensity) on the irradiated surface P2 due to the aberration of the projection optical system 15, in the present embodiment, a plurality of microlenses (optical elements) 40 is disposed to allow a plurality of laser beams emitted from the plurality of surface-emitting laser elements 21 (light emitters) of the surface-emitting laser 20 to pass therethrough, respectively. Tire plurality of microlenses 40 (including a first optical element and a second optical element to be described later) creates variations in divergence angles of laser beams emitted from the plurality of surface-emitting laser elements 21, respectively. In this case, the plurality of surface-emitting laser elements 21 corresponds to the plurality of microlenses 40 on a one-to-one basis.

More specifically, the plurality of microlenses 40 (including the first optical element and second optical element to be described later) has optical surfaces with shapes different from each other (for example, a convex surface, a concave surface, and the optical parameters such as the curvatures of the convex surface and the concave surface, and the presence or absence of the aspherical surface) to crease variations in divergence angles of laser beams emitted from the plurality of surface-emitting laser elements 21, respectively. Further, each of the plurality of microlenses 40 has at least one surface with a different refractive index.

When pincushion distortion occurs in the irradiated surface P2, for example, the divergence angles of the laser beams emitted from microlenses 40 at the central portion of the light-emitting surface P1 are increased, and the divergence angles of the laser beams emitted from microlenses 40 in the peripheral portion of the light-emitting surface P1 are reduced. This treatment enables a reduction in illuminance at the peripheral portion of the irradiated surface P2 due to the pincushion distortion to be corrected, and thus a uniform illuminance is obtained over the irradiated surface P2.

When barrel distortion occurs in the irradiated surface P2, the divergence angles of the laser beams emitted from microlenses 40 at the central portion of the light-emitting surface P1 are reduced, and the divergence angles of the laser beams emitted from microlenses 40 at the peripheral portion of the light-emitting surface P1 are increased. This treatment enables a reduction in illuminance at the central portion of the irradiated surface P2 due to the barrel distortion to be corrected, and thus a uniform illuminance is obtained over the irradiated surface P2.

As described above, in the present embodiment, the divergence angles of laser beams from the microlenses 40 are changed to increase the light intensity at a region where the illuminance is reduced so as to correct a reduction in illuminance on the irradiated surface P2 due to distortion aberrations. Thus, a uniform illuminance is obtained over the irradiated surface P2. In other words, the light-emitting surfaces of the VCSEL (the surface-emitting laser elements 21) are associated with the irradiated surfaces corresponding to the microlenses (the microlenses 40). This arrangement provides a uniform illuminance across the irradiated surface P2.

The divergence angle of a laser beam emitted from a microlens 40 is defined as the degree to which a laser beam that has been emitted from a surface-emitting laser element 21 and passed through a corresponding one of the microlenses 40 spreads. The degrees of divergence angles are typically compared with each other by convening the divergence angles into numbers using a angle (a half width) at which the intensity is half of the intensity (the peak intensity) of light on the optical axis, or a value for $1/e^2(I/e^2)$.

Figure 6:
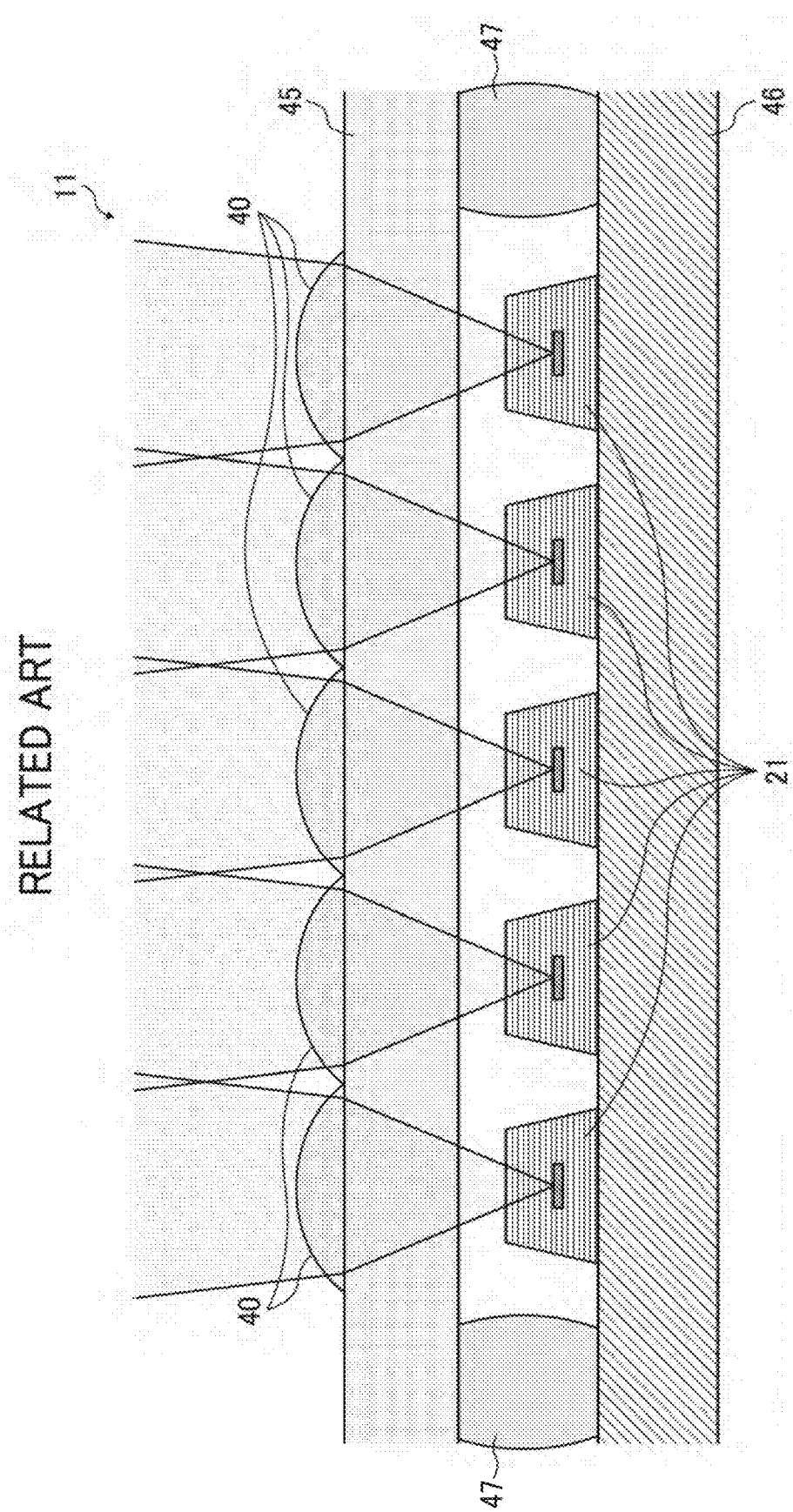
FIG. 6 is an illustration of a plurality of microlenses from which laser beams with the same divergence angle are emitted, according to a comparative example.

FIG. 6 is an illustration of the plurality of microlenses 40 from which laser beams with the same divergence angle are emitted, according to a comparative example.

In FIG. 6, five microlenses 40 (optical elements) are arranged in the lateral direction, which forms a microlens array 45 (an optical-element array) as a single integrated unit. Below the microlens array 45, five surface-emitting laser elements 21 (light emitters) are arranged in the lateral direction. The live surface-emitting laser devices 21 are disposed on a substrate 46. The lower surface of the microlens array 45 and an area where the surface-emitting laser elements 21 are not disposed on the upper surface of the substrate are connected by a base 47. In the present embodiment, the laser beams emitted from the five surface-emitting laser elements 21 are assumed to have the same light intensity (irradiation intensity, output power).

In FIG. 6, the optical surfaces of the five microlenses 40 have the same shape. In other words, the optical surfaces are convex surfaces with the same curvature, facing upward. Further, the five microlenses 40 have the same refractive index. In this arrangement, with an increase in distance along the lateral direction from the microlens 40 at the center, the variations in illuminance on the irradiated surface P2 due to the aberrations of the projection optical system 15 occurs more. When the pincushion distortion occurs, the intensity of the laser beam emitted from the microlens 40 at the center is largest, the intensity of the laser beams emitted from the microlenses 40 at the right and left of the center is the second largest, and the intensity of the laser beams emitted from the microlenses 40 at the right and left ends of all of the microlenses 40 is smallest among those from the plurality of microlenses 40.

FIG. 7A is a side view of the plurality of microlenses 40 with optical surfaces of different shapes to provide different divergence angles, according to a first embodiment. FIG. 7B is a top view of the plurality of microlenses 40 with optical surfaces of different shapes to produce different divergence angles, according to the first embodiment. The side view of FIG. 7A represents the five microlenses, which are illustrated at the low er side of the top view of FIG. 7B. In FIG. 7B, the effective diameter of each of the plurality of microlenses 40 is indicated by the solid annular lines.

In FIGS. 7A and 7B, a microlens 40A at the center, two microlenses 40B at the left and right of the microlens 40A, and two microlenses 40C at the left and right ends of all of the microlenses arranged are formed as a single integrated microlens array 45. Further, five surface-emitting laser elements 21 are arranged in the lateral direction below the microlenses 40A, 40B, and 40C. The five surface-emitting laser devices 21 are disposed on a substrate 46. The lower surface of the microlens array 45 and an area where the surface-emitting laser elements 21 are not disposed on the upper surface of the substrate are connected by a base 47.

The microlenses 40A, 40B, and 40C each have a convex optical surface. The curvature of the convex optical surface is the smallest for the microlens 40A, the second smallest for the microlenses 40B, and the largest for the microlenses 40C. With this configuration, the divergence angle of the emitted laser beam is the largest for the microlens 40A, the second largest for the microlenses 40B, and the smallest for the microlenses 40C.

In the relation between the microlens 40A and the microlenses 40B, the microlens 40A corresponds to a first optical element that has a convex optical surface with a relatively small curvature and provides a relatively large divergence angle, and the microlenses 40B correspond to a second element that has a convex optical surface with a relatively large curvature and provides a relatively small divergence angle. In the relation between the microlenses 40B and the microlenses 40C, the microlenses 40B corresponds to the first optical element that has a convex optical surface with a relatively small curvature and provides a relatively large divergence angle, and the microlenses 40C correspond to a second element that has a convex optical surface with a relatively large curvature and provides a relatively small divergence angle.

The projection optical system 15 serves to project laser beams that has been emitted from the plurality of surface-emitting laser elements 21 (light emitters) and passed through the plurality of microlenses 40 (optical elements). The projection optical system 15 has a magnification power that differs depending on an irradiated spot. The magnification power of the projection optical system 15 decreases as the irradiated position is closer to the center of the irradiated area as a whole, and increases as the irradiated position is closer to the peripheral portion of the irradiated area as a whole.

In FIGS. 7A and 78, the central portion of the irradiated area, for which the magnification power of the projection optical system 15 is the smallest, is irradiated with the laser beam of a largest divergence angle emitted from the microlens 40A. The right and left sides of the central portion of the irradiated area, for which the magnification power of the projection optical system 15 is the second smallest, is irradiated with the laser beams of the second largest divergence angle emitted from the microlenses 40B. The right and left ends of the irradiated area, for which the magnification power of the projection optical system 15 is the largest, is irradiated the laser beams of a smallest divergence angle emitted from the microlenses 40C.

In other words, for the relation between the microlens 40A and the microlenses 40B, the microlens 40A corresponds to the first optical element that provides a relatively large divergence angle for the central portion of the irradiated area as a whole, for which the magnification power of the projection optical system 15 is relatively small. Further, the microlenses 40B correspond to the second optical element that provides a relatively small divergence angle for the peripheral portion of the irradiated area as a whole, for which the magnification power of the projection optical system 15 is relatively large. In the relation between the microlenses 40B and the microlenses 40C, the microlenses 40B corresponds to the first optical element that provides a relatively large divergence angle for the central portion of the irradiated area as a whole, for which the magnification power of the projection optical system 15 is relatively small. Further, the microlenses 40C correspond to the second optical element that provides a relatively small divergence angle for the peripheral portion of the irradiated area as a whole, for which the magnification power of the projection optical system 15 is relatively large.

Figure 8:
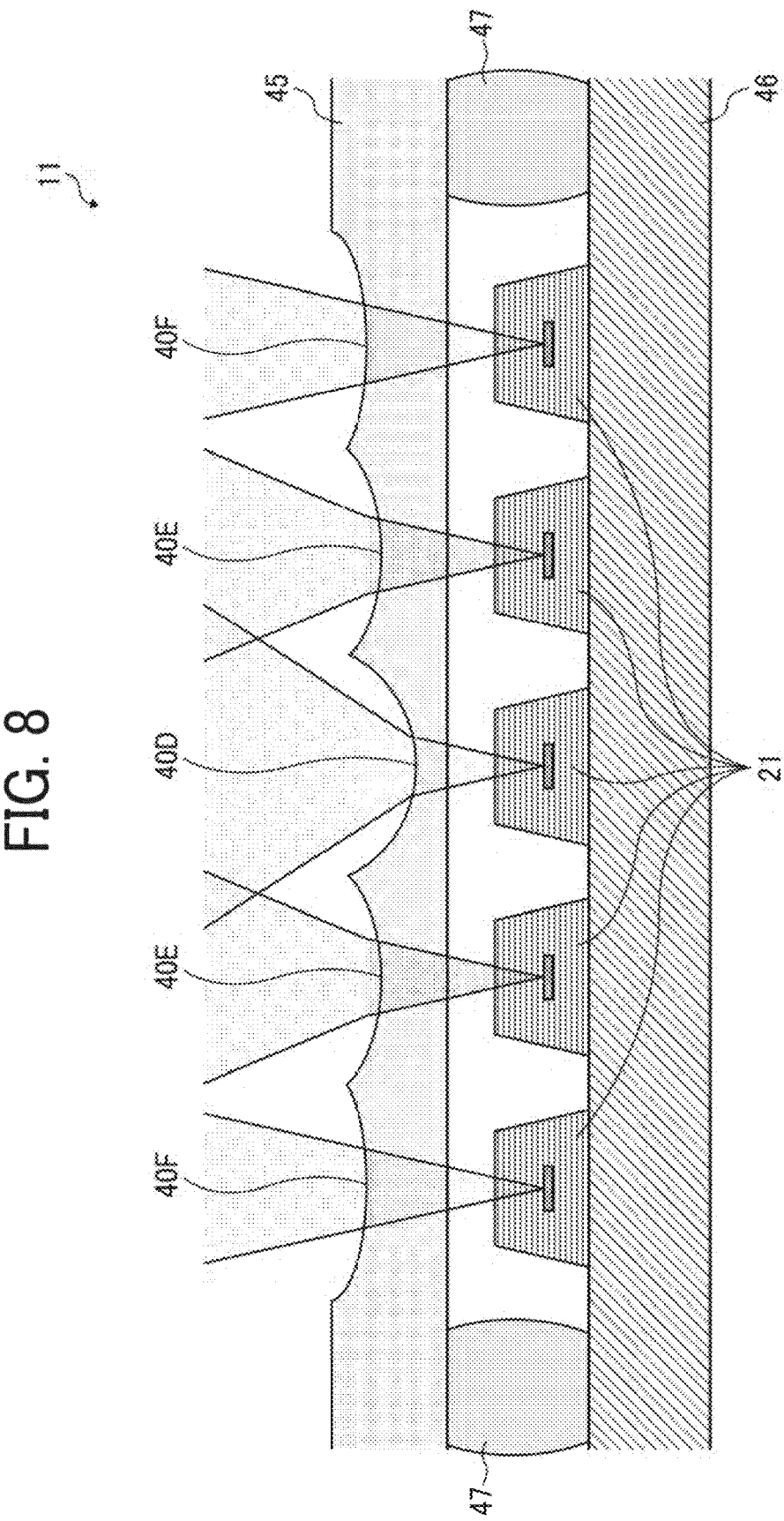
FIG. 8 is an illustration of a plurality of microlenses with optical surfaces having different shapes, from which laser beams with different divergence angles are emitted, according to another embodiment of the present disclosure.

FIG. 8 is an illustration of a plurality of microlenses 40 with optical surfaces of different shapes, from which laser beams with different divergence angles are emitted, according to a second embodiment of the present disclosure.

In the example of FIG. 8, a microlens 40D at the center, two microlenses 40E at the right and left of the microlens 40D, and two microlenses 40F at the right and left ends of all of the microlenses arranged are formed as a single integrated microlens array 45. Further, five surface-emitting laser elements 21 are arranged in the lateral direction below the microlenses 40D, 40E, and 40F. The live surface-emitting laser devices 21 are disposed on a substrate 46. The lower surface of the microlens array 45 and an area where the surface-emitting laser elements 21 are not disposed on the upper surface of the substrate are connected by a base 47.

The microlenses 40D, 40E, and 40F each have a concave optical surface. The curvature of the concave optical surface is the largest for the microlens 40D, the second largest for the microlenses 40E, and the smallest for the microlenses 40F. With this configuration, the divergence angle of the emitted laser beam is the largest for the microlens 40D, the second largest for the microlenses 40E, and the smallest for the microlenses 40F.

In the relation between the microlense 40D and the microlenses 40E, the microlens 40D corresponds to a first optical element that has a concave optical surface with a relatively large curvature and provides a relatively large divergence angle, and the microlenses 40E correspond to a second optical element that has a concave optical surface with a relatively small curvature and provides a relatively small divergence angle. In the relation between the microlenses 40E and the microlenses 40F, the microlenses 40E corresponds to the first optical element that has a concave optical surface with a relatively large curvature and provides a relatively large divergence angle, and the microlenses 40F correspond to the second optical element that has a concave optical surface with a relatively small curvature and provides a relatively small divergence angle.

The projection optical system 15 serves to project laser beams that has been emitted from the plurality of surface-emitting laser elements 21 (light emitters) and passed through the plurality of microlenses 40 (optical elements). The projection optical system 15 has a magnification power that differs depending on an irradiated spot. The magnification power of the projection optical system 15 decreases as the irradiated position is closer to the center of the irradiated area as a whole, and increases as the irradiated position is closer to the peripheral portion of the irradiated area as a whole.

In FIG. 8, the central portion of the irradiated area as a whole, for which the magnification power of the projection optical system 15 is the smallest, is irradiated with the laser beam of the largest divergence angle emitted front the microlens 40D. The right and left sides of the central portion of the irradiated area as a whole, for which the magnification power of the projection optical system 15 is the second smallest, is irradiated with the laser beams of the second largest divergence angle emitted from the microlenses 40E. The right and left ends of the irradiated area as a whole, for which the magnification power of the projection optical system 15 is the largest, is irradiated with the laser beams of a smallest divergence angle emitted from the microlenses 40F.

In other words, in the relation between the microlens 40D and the microlenses 40E, the microlens 40D corresponds to the first optical element that provides a relatively large divergence angle for the central portion of the irradiated area as a whole, for which the magnification power of the projection optical system 15 is relatively small. Further, the microlenses 40E correspond to the second optical element that provides a relatively small divergence angle for the peripheral portion of the irradiated area as a whole, for which the magnification pow er of the projection optical system 15 is relatively large. In the relation between the microlenses 40E and the microlenses 40F, the microlenses 40E corresponds to the first optical element that provides a relatively large divergence angle for the central portion of the irradiated area as a whole, for which the magnification power of the projection optical system 15 is relatively small. Further, the microlenses 40F correspond to the second optical element that provides a relatively small divergence angle for the peripheral portion of the irradiated area as a whole, for which the magnification power of the projection optical system 15 is relatively large.

The microlenses 40A to 40C in FIGS. 7A and 7B and the microlenses 40D to 40F have material transparent in the wavelengths of emitted laser beams. These microlenses may be manufactured, for example, by mechanical processing of glass or resin material, removal processing such as etching, or molding processing using a mold having a microlens inversion structure. The mold is manufactured by cutting using a 5-axis machine tool, for example. The microlens array is mourned on the VCSEL using, for example, solder, UV curing adhesive, and thermosetting adhesive.

Figure 9:
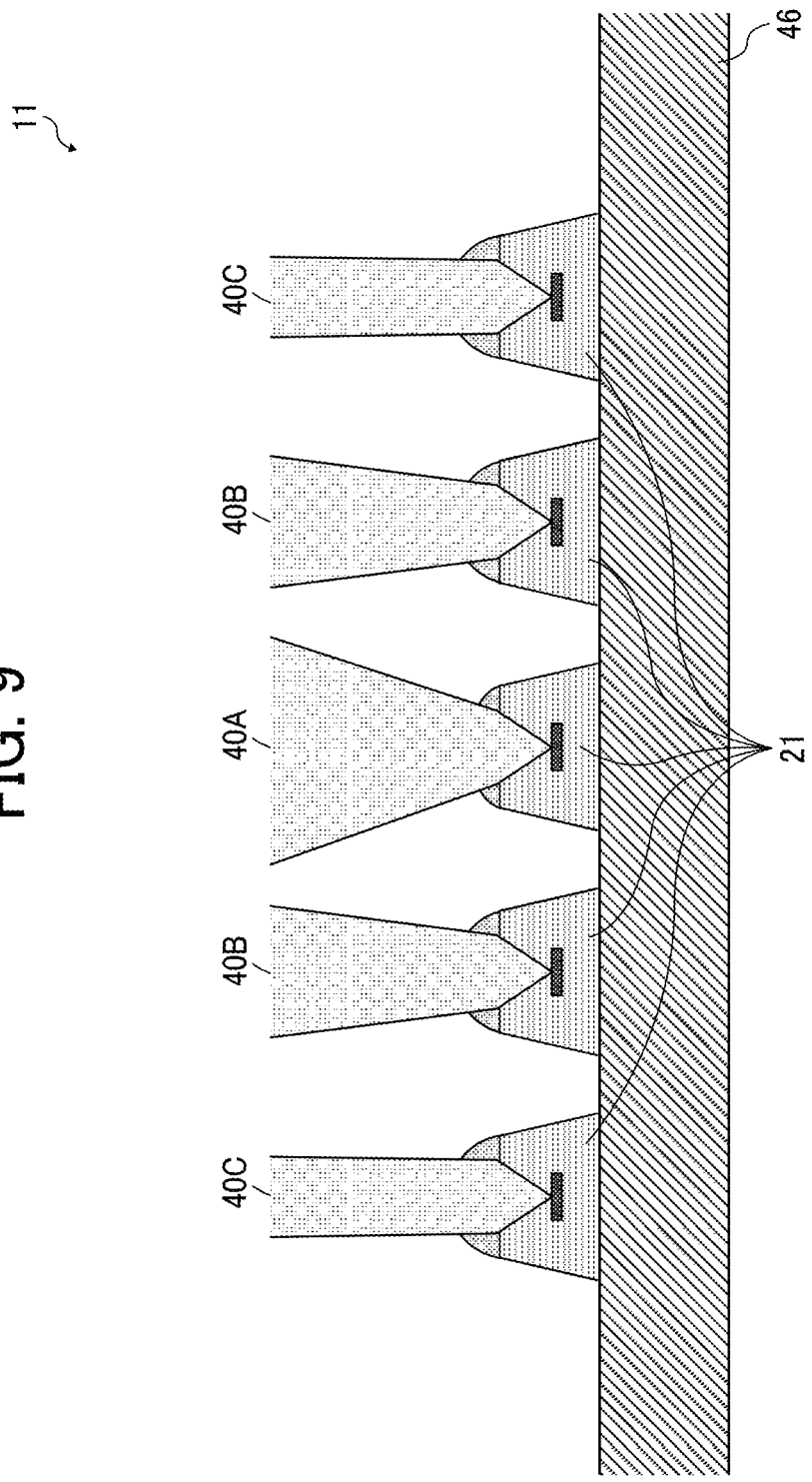
FIG. 9 is an illustration of a plurality of microlenses on the plurality of surface-emitting laser elements, according to an embodiment of the present disclosure.

FIG. 9 is an illustration of a plurality of microlenses 40 on the plurality of surface-emitting laser elements 21, according to an embodiment of the present disclosure. Forming the microlenses 40 directly on the surface-emitting laser elements 21 as illustrated in FIG. 9 increases the mount accuracy and thus provides a uniform illuminance distribution. Such a configuration eliminates the adverse effect of the difference in linear expansion between the microlens array and the VCSEL, which provides greater durability against changes in temperature.

In FIG. 9, the surface emitting laser elements 21 are provided on the substrate 46, and the microlenses 40A, 40B, and 40C in FIG. 7 are arranged on the upper surface (immediately above) of the surface-emitting laser elements 21. The microlenses 40A, 40B, and 40C are, for example, those in which an energy curable resin that is liquid at room temperature, such as UV/EB/heat, is discharged and cured at each light emitting point on a mesa having a resonator formed therein. Since the ejected resin material does not spread beyond the mesa diameter due to the so-called "wetting pinning effect" of the mesa structure, lenses having different curvatures can be easily formed by changing the ejection amount.

Figure 10:
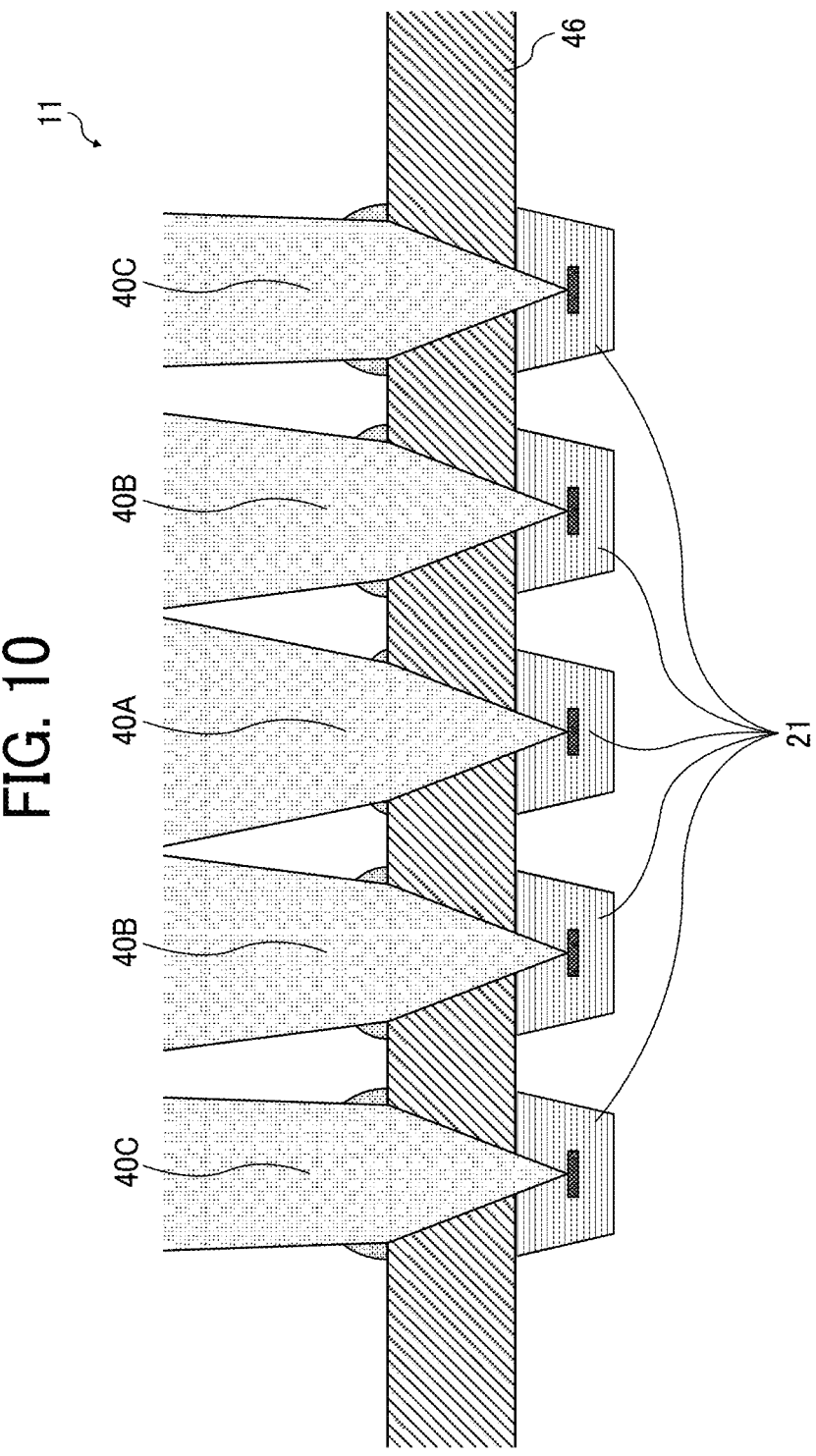
FIG. 10 is an illustration of a plurality of microlenses on a substrate, according to an embodiment of the present disclosure.
Figure 11:
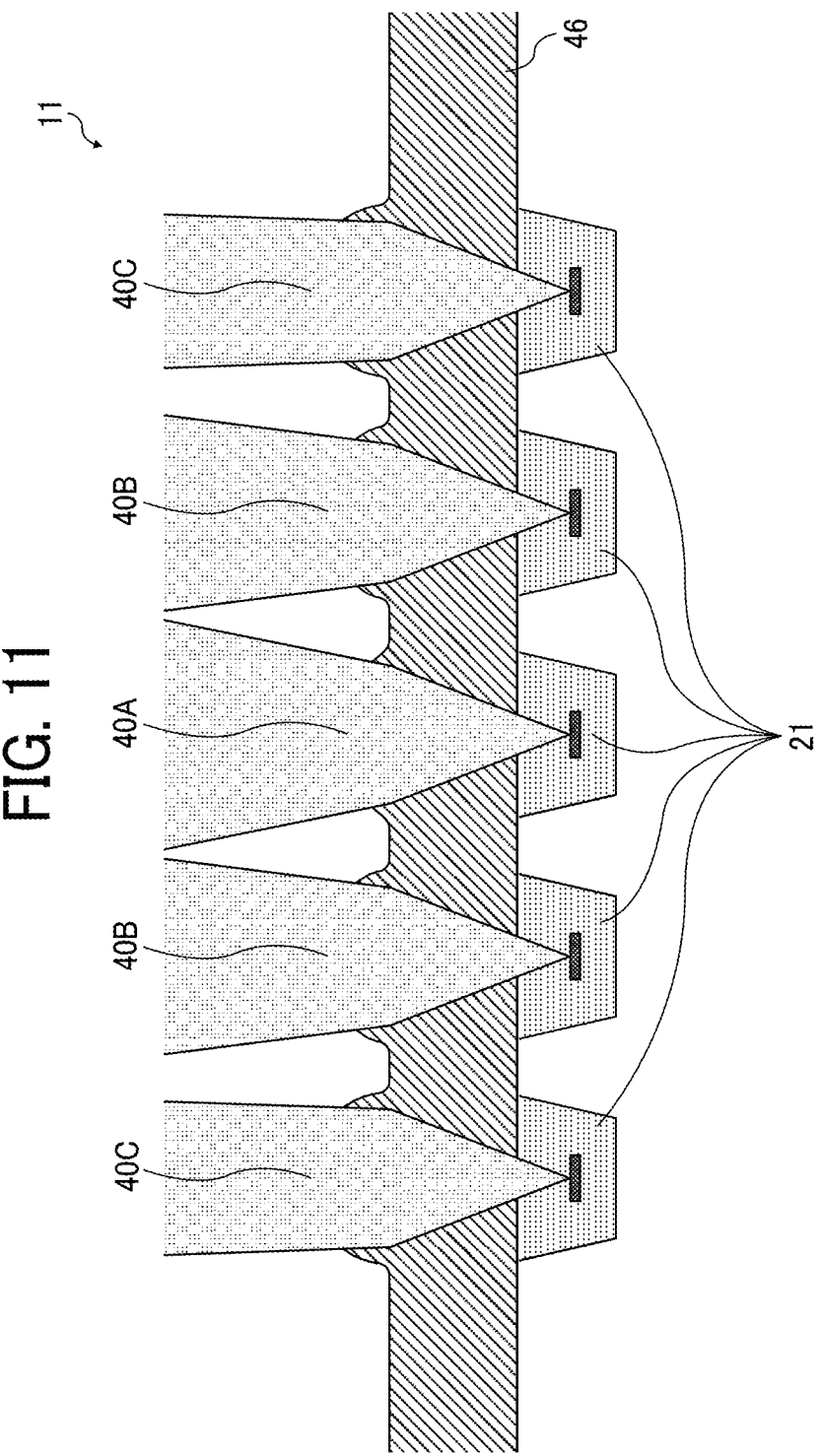
FIG. 11 is an illustration of a plurality of microlenses on a substrate, according to another embodiment of the present disclosure.
Figure 12:
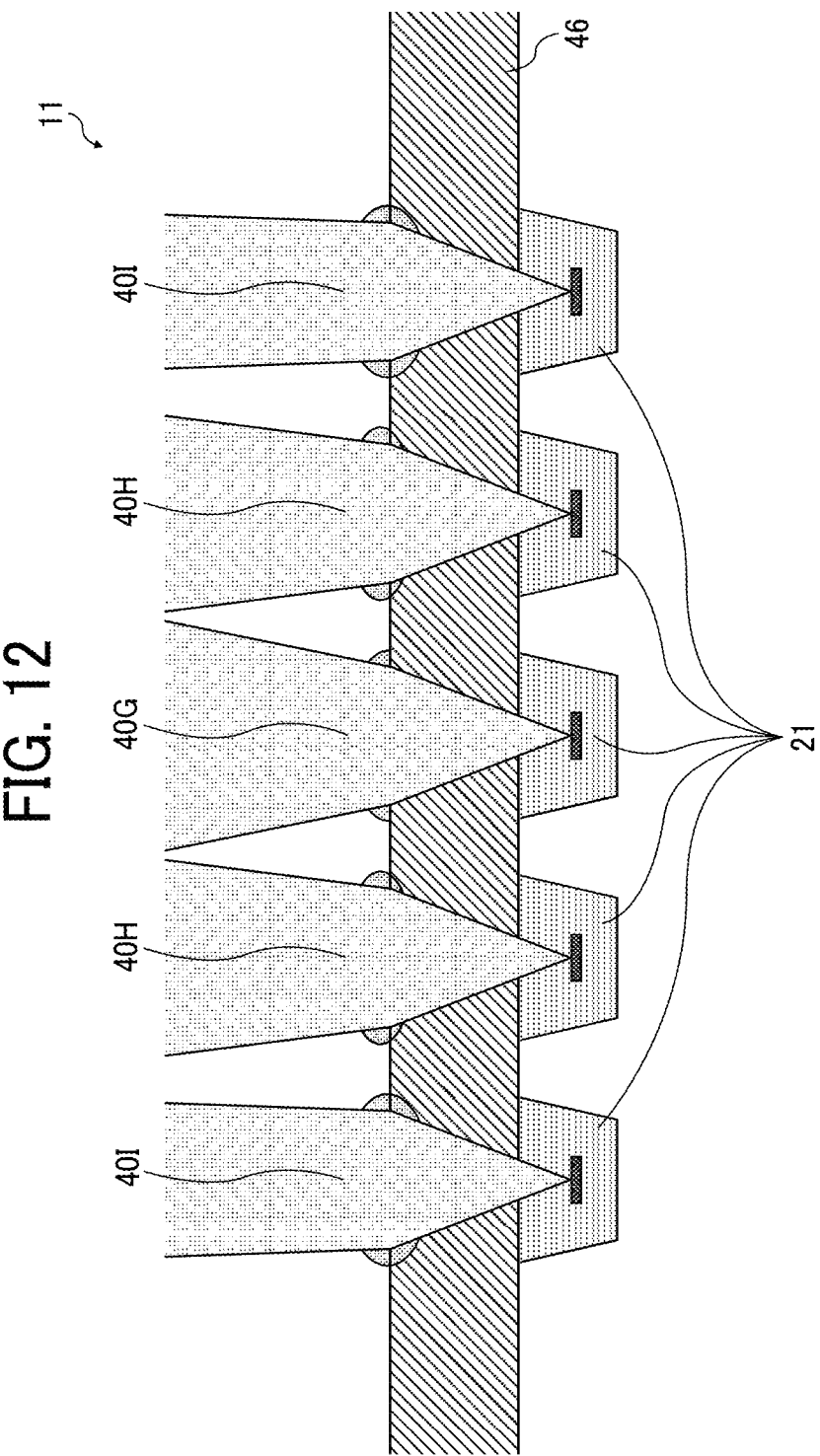
FIG. 12 is an illustration of a plurality of microlenses on a substrate, according to still another embodiment of the present disclosure.

FIGS. 10, 11, and 12 are illustrations of a plurality of microlenses 40 on the substrate 46, according to different embodiments. In FIGS. 10 to 12, the five microlenses 40 and the surface-emitting laser elements 21 are disposed with the substrate therebetween. In other words, the substrate 46 is disposed between the microlenses 40 and the surface-emitting laser elements 21. In this case, the microlenses 40 are formed on the substrated 46.

FIG. 10 indicates an example of a back-emitting VCSEL in which the back surface (the lower side of the substrate 46 in FIG. 10) of the substrate 46 (a VCSEL substrate) emits laser beams, and the microlenses 40A, 40B, and 40C in FIG. 7 are disposed on the front side (the upper side of the substrate 46 in FIG. 10) of the VCSEL.

FIGS. 13A to 13F are illustrations of how a microlens 40 (in this case, the microlenses are not distinguished between the microlenses 40A, 40B, and 40C) is mounted on the surface of the substrated 46 (the VSCEL substrate), according to an embodiment of the present disclosure.

Figure 13A:
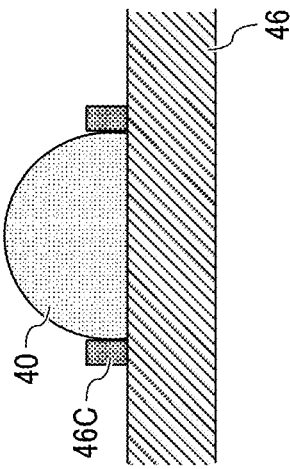
FIGS. 13A to 13F are illustrations of how a microlens is mounted on a surface of substrate, according to an embodiment of the present disclosure.
Figure 13B:
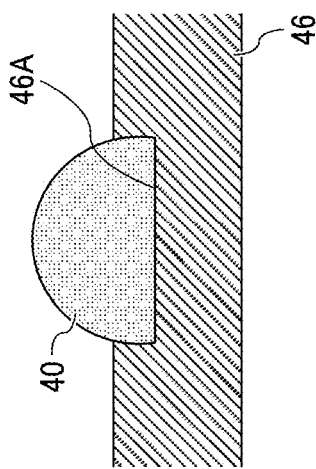
Figure 13C:
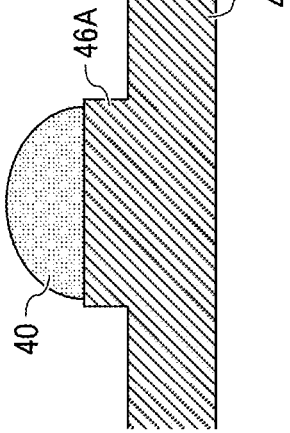

In FIG. 13A, a mounting protrusion 46A is provided on a surface of the substrate 46, and a microlens 40 is formed on the upper surface of the mounting protrusion 46A. In FIG. 13B, a mounting recess 46B is provide ti on the surface of the substrate 46, and a microlens 40 is formed so as to project upward from the inside of the mounting recess 46B. In FIG. 13C, a mounting frame 46C is provided on the surface of the substrate 46, and the microlens 40 is formed so as to be surrounded by the mounting frame 46C.

Figure 13D:
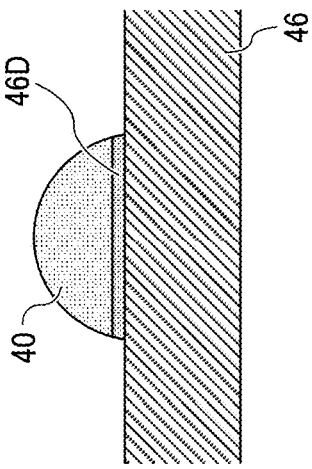
Figure 13E:
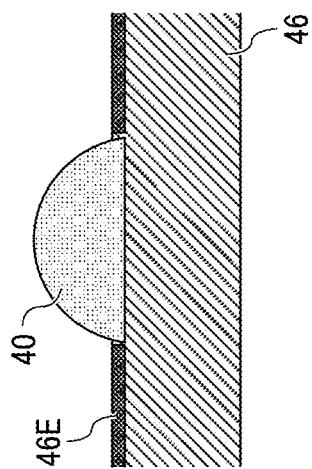
Figure 13F:
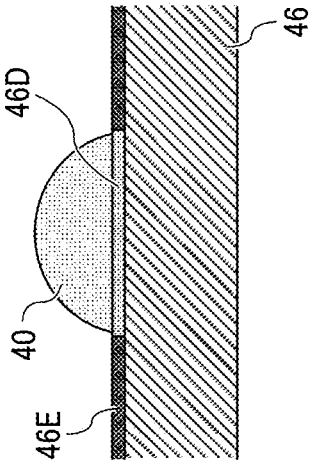

In FIG. 13D, a lyophilic pattern 46D with a relatively large surface energy is provided in an area where the lens is formed on the surface of the substrate 46, and a liquid-repellent pattern 46E having a relatively small surface energy is provided in an area where the lens is not formed on the surface of the substrate 46. The microlens 40 is formed on the upper surface of the lyophilic pattern 46D. In FIG. 13E, the liquid-repellent pattern 46E is provided in the area for not forming the lens on the surface of the substrate 46, and the microlenses 40 is formed at the area for forming the lens at the inside of the liquid-repellent pattern 46E. In FIG. 13F, a lyophilic pattern 46D is provided in the area for forming the lens on the surface of the substrate 46, and the microlenses 40 is formed on the upper surface of the lyophilic pattern 46D. By providing the lyophilic pattern 46D on the area for forming the lens and/or forming the lyophobic pattern 46D on the area for not forming the lens on the surface of the substrate 46, the material ejected by the wetting pinning effect is reduced from spreading. This increases the amount of sag while maintaining a constant diameter of the lens even if the ejection amount of the lens material is increased. Thus, the curvature of the lens can be changed.

FIG. 11 indicates an example of a back-emitting VCSEL in which the back surface (the lower side of the substrate 46 in FIG. 11) of the substrate 46 (a VCSEL substrate) emits laser beams, and the microlenses 40A, 40B, and 40C in FIG. 7 are formed as a single integral unit on the front side (the upper side of the substrate 46 in FIG. 11) of the VCSEL. In other words, the microlenses 40A, 40B, and 40C are part of the substrate 46. More specifically, microlenses with different radii of curvature are formed on the substrate 46 with resist materials, and partly removed by etching. This method, which involves the removing process to form a lens, is applicable for forming a microlens array with a concave surface as illustrated in FIG. 8, and also for a combination thereof. In the configuration of FIG. 11, the substrate 46 and the microlenses 40A, 40B, 40C are formed from the same material. This eliminates the occurrence of a difference in refractive index or a difference in linear expansion between the materials of the interfaces between the microlenses 40A, 40B, 40C and the substrate 46, which provides a structure with a higher transmittance and reliability.

FIG. 12 indicates an example of a back-emitting VCSEL in which the back surface (the lower side of the substrate 46 in FIG. 12) of the substrate 46 (a VCSEL substrate) emits laser beams, and microlenses 40G, 40H, and 40I are disposed on the front side (the upper side of the substrate 46 in FIG. 12) of the VCSEL.

The microlens 40G is a resin lens and has a convex optical surface protruding upward, and the lower surface is a flat surface (having a plano-convex shape). The microlenses 40H has a convex optical surface formed from a resin lens and protruding upward, and a concave optical surface formed from, for example, GaAs and protruding downward. The microlenses 40I has a convex optical surface formed from a resin lens and protruding upward, and a concave optical surface formed from, for example, GaAs and protruding downward. The curvature of the convex optical surface is the same between the microlenses 40H and the microlenses 40I. The curvature of the concave optical surface is larger for the microlenses 40I than for the microlenses 40H. With this configuration, the divergence angle of the emitted laser beam is the largest for the microlens 40G, the second largest for the microlenses 40H, and the smallest for the microlenses 40I. A microlens is formed by combing a resin lens (e.g., a convex lens) and a GaAs lens (e.g., a concave lens), In this configuration, the convex lens of the resin lens converges a laser beam that has been diverged once by the concave lens of the GaAs lens. This enables the divergence angle to be adjusted more precisely so reduce the divergence angle more.

Figure 14:
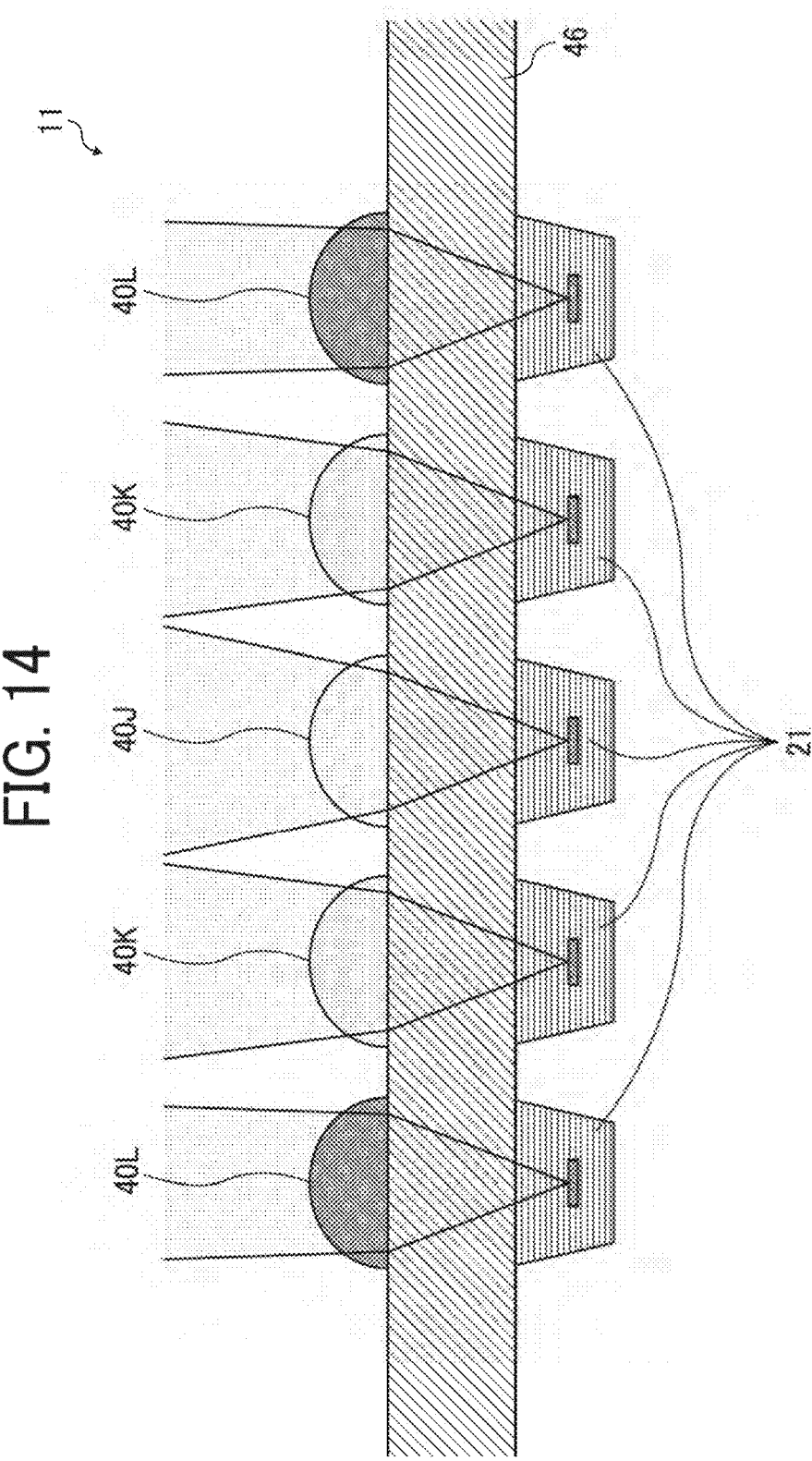
FIG. 14 is an illustration of a plurality of microlenses with different of active indexes to produce variations in divergence angles, according to an embodiment.

FIG. 14 is an illustration of a plurality of microlenses 40 with different refractive indexes to produce variations in divergence angles, according to an embodiment. In stead of the shape (curvature) of the microlenses 40, the refractive index distribution of the microlenses 40 may be changed to vary the divergence mules of the microlenses 40. The refractive index distribution o the microlenses 40 may be changed, for example, by ejecting and curing a plurality of energy curable resin materials having different refractive indexes to e corresponding locations. The refractive index is adjustable in a range of from approximately 1.4 to 1.6 by mixing the materials, in this case, as the lenses have the shape, there is no need to change the ejection amount of the lens material for each light emitting point. This enable lenses to be stably produced.

FIG. 14 indicates an example of a back-emitting VCSEL in which the back surface (the lower side of the substrate 46 in FIG. 14) of the substrate 46 (a VCSEL substrate) emits laser beams. The microlens 40J is disposed in the center, two microlenses 40K are disposed at the right and left of the microlens 40J at the center, and two microlenses 40L are disposed at the right and left ends surface (the upper side of the substrate 46 in FIG. 14) of the VCSEL.

The microlenses 40J, 40K, and 40L each have a convex optical surface with the same curvature. The refractive index is the smallest for the microlenses 40J, the second smallest for the microlenses 40K, and the largest for the microlenses 40L. With this configuration, the divergence angle of the emitted laser beam is the largest for the microlenses 40J, the second largest for the microlenses 40K, and the smallest for the microlenses 40L.

In the relation between the microlens 40J and the microlenses 40K, the microlens 40J corresponds to a first optical element that has a relatively small refractive index and provides relatively large divergence angle, and the microlenses 40K correspond to a second element that has a relatively large refractive index and provides a relatively small divergence angle. In the relation between the microlenses 40K and the microlenses 40L, the microlenses 40K corresponds to the first optical element that has a relatively small refractive index and provides a relatively large divergence angle, and the microlenses 40L correspond to the second element that has a relatively large refractive index and provides a relatively small divergence angle.

The projection optical system 15 serves to project laser beams that has been emitted from the plurality of surface-emitting laser elements 21 (light emitters) and passed through the plurality of microlenses 40 (optical elements). The projection optical system 15 has a magnification power that differs depending on an irradiated spot. The magnification power of the projection optical system 15 decreases as the irradiated position is closer to the center of the irradiated area, and increases as the irradiated position is closer to the peripheral portion the irradiated area.

In FIG. 14, the central portion of irradiated area, for which the magnification power of the projection optical system 15 is the smallest, is irradiated with the laser beam of the largest divergence angle emitted from the microlens 40J. The right and left sides of the central portion of the irradiated area, for which the magnification power of the projection optical system 15 is the second smallest, is irradiated with the laser beams of the second largest divergence angle emitted from the microlenses 40K. The right and left ends of the irradiated area, for which the magnification power of the projection optical system 15 is the largest, is irradiated with laser beams of a smallest divergence angle emitted from the microlenses 40L.

In other words, in the relation between the microlens 40J and the microlenses 40K, the microlens 40J corresponds to the first optical element that provides a relatively large divergence angle for the central portion of the irradiated area, for which the magnification power of the optical system 15 is relatively small. Further, the microlenses 40K correspond to the second optical element that provides a relatively small divergence angle for the peripheral portion of the irradiated area, for which the magnification power of the projection optical system 15 is relatively large. In the relation between the microlenses 40K and the microlenses 40L, the microlenses 40K corresponds to the first optical element that provides a relatively large divergence angle for the central portion of the irradiated area, for which the magnification power of the projection optical system 15 is relatively small. Further, the microlenses 40L correspond to the second optical element that provides a relatively small divergence angle for the peripheral portion of the irradiated area, for which the magnification power of the projection optical system 15 is relatively large.

In some examples, the embodiments of FIGS. 7 to 13, and 14 are combined to change the shapes (curvatures) of the microlenses 40 and also the refractive index distributions of the microlenses 40 so as to change the divergence angles of the microlenses 40. This configuration provides variations in divergence angle between the central portion and the peripheral portions without excessively increasing or reducing the curvature of the microlenses 40. This facilitates manufacturing process of the microlenses 40. FIGS. 15A, 15B, 16A, 16B, and 17 are illustrations of simulations indicating superiority of the light-source device according to an embodiment of the present disclosure.

Figure 15A:
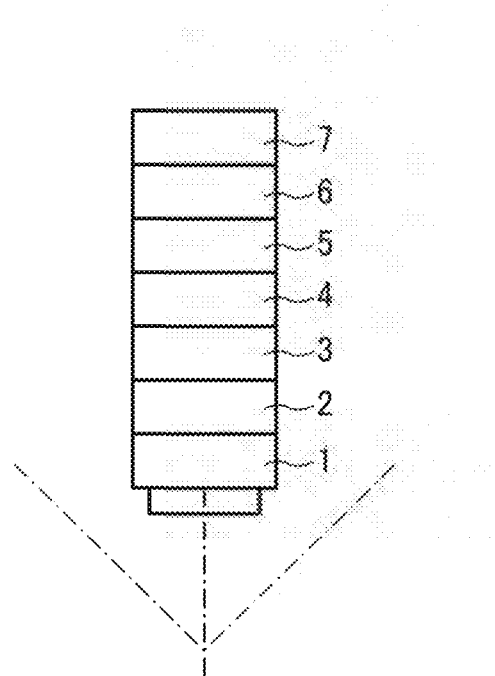
FIGS. 15A and 15B are illustrations of a simulation indicating superiority of the light-source device, according to an embodiment of the present disclosure.
Figure 15B:
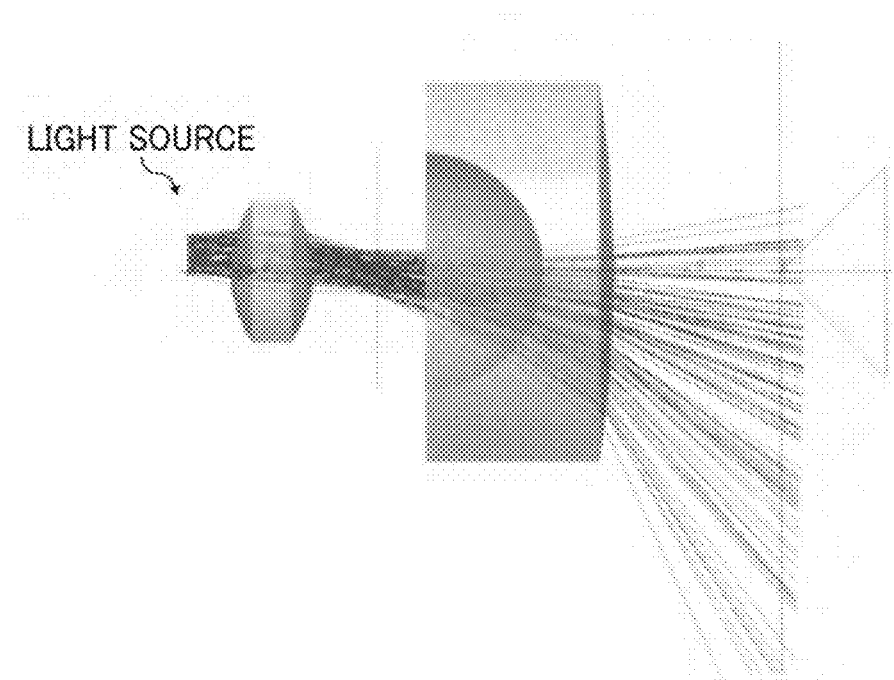

As illustrated in FIG. 15A, it is assumed that the light source includes seven light emitters 1, 2, 3, 4, 5, 6, and 7 arranged in the vertical direction of the illuminance distribution. The light emitter 1 is located closest to the center of the illuminance distribution, and the light emitters 2 to 6 are located in that order in a direction from the center side to the peripheral side of the illuminance distribution. The light emitter 7 is located closest to the peripheral portion of the illuminance distribution. The illuminance refers to the intensity of light emitted from the vertical direction with respect to the angular direction. As illustrated in FIG. 15B, with an increase in the angles of the laser beams emitted by the projector lens (the projection optical system), the illuminance (irradiation intensity) is the strongest at the center of the irradiated surface, and decreases ire a direction to the peripheral portion of the irradiated area.

Figure 16A:
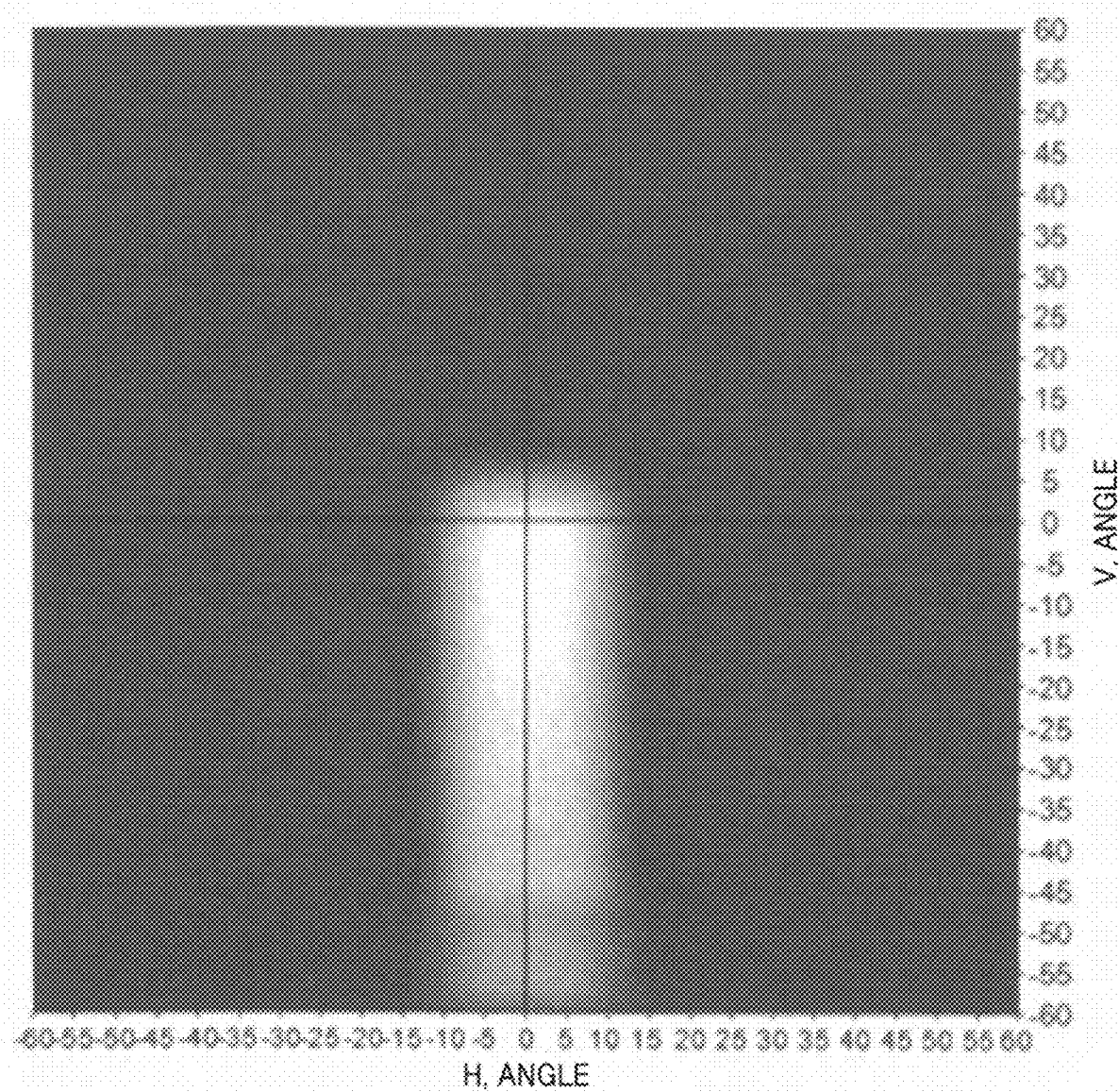
FIGS. 16A and 16B are illustrations of a simulation indicating superiority of the light-source device, according to another embodiment of the present disclosure.
Figure 16B:
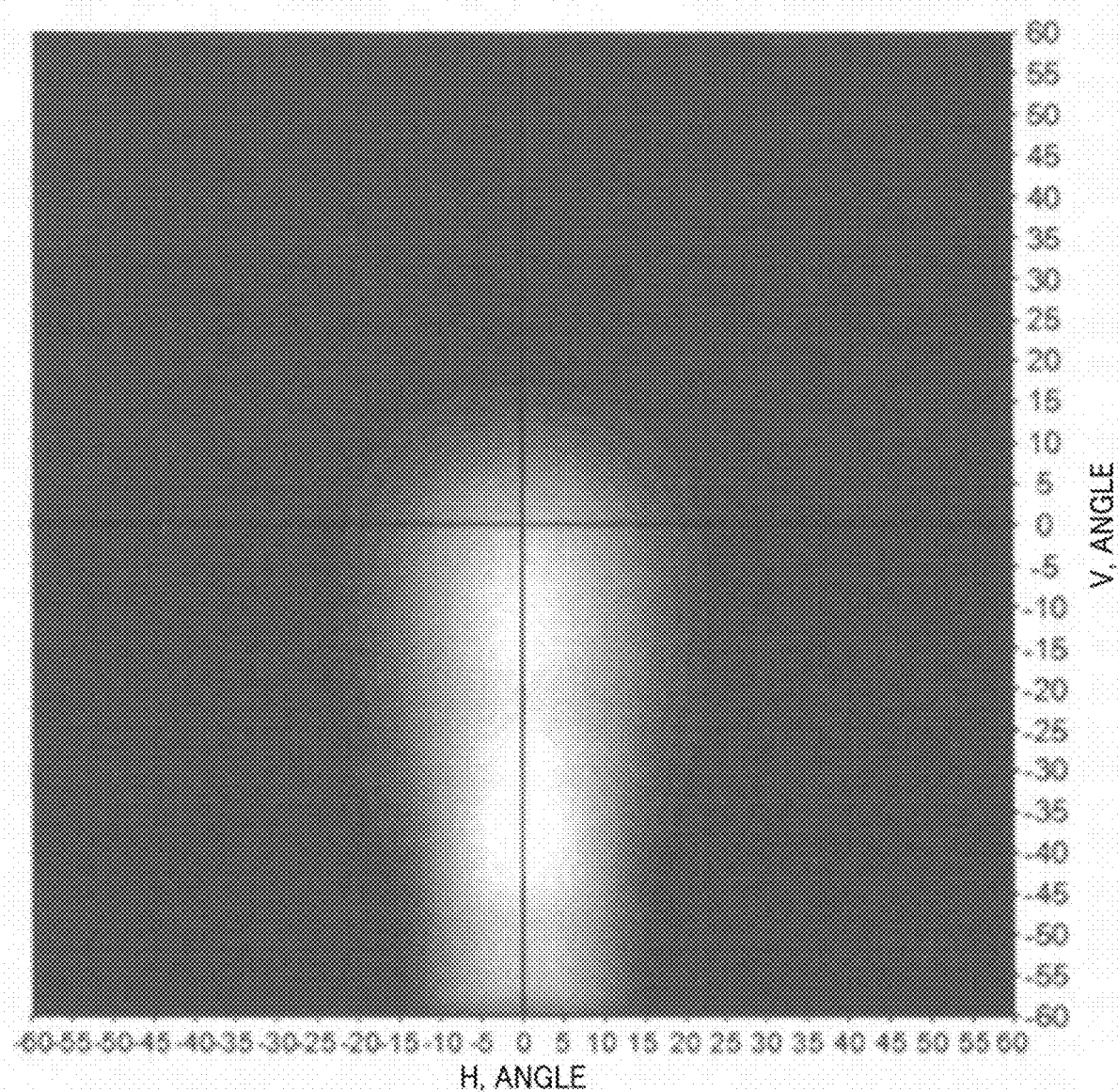

FIG. 16A is a graph of the simulation results when the microlenses for the light emitters 1 to 7 have the same divergence angle. As is clear from FIG. 16A, the illuminance increases as the irradiated spot is closer to the center of the irradiated surface, and the illuminance decreases as the irradiated spot is closer to the peripheral portion of the irradiated surface. The variations in illuminance, i.e., non-uniformity in illuminance, across the irradiated surface occurs. FIG. 16B is a graph of the simulation results when the microlenses for the light emitters 1 to 7 have different divergence angles, that is, the light emitter 1 to 7 are arranged in descending order of divergence angle of a microlens. The divergence angle of the microlens corresponding to the light emitter 1 is set to 17°, and the divergence angle of the microlens corresponding to the light emitter 7 is set to 7°, for example. As is clear from FIG. 16B, the uniformity of the illuminance is improved from the central portion to the peripheral portion of the irradiated surface as compared with FIG. 16A.

Figure 17:
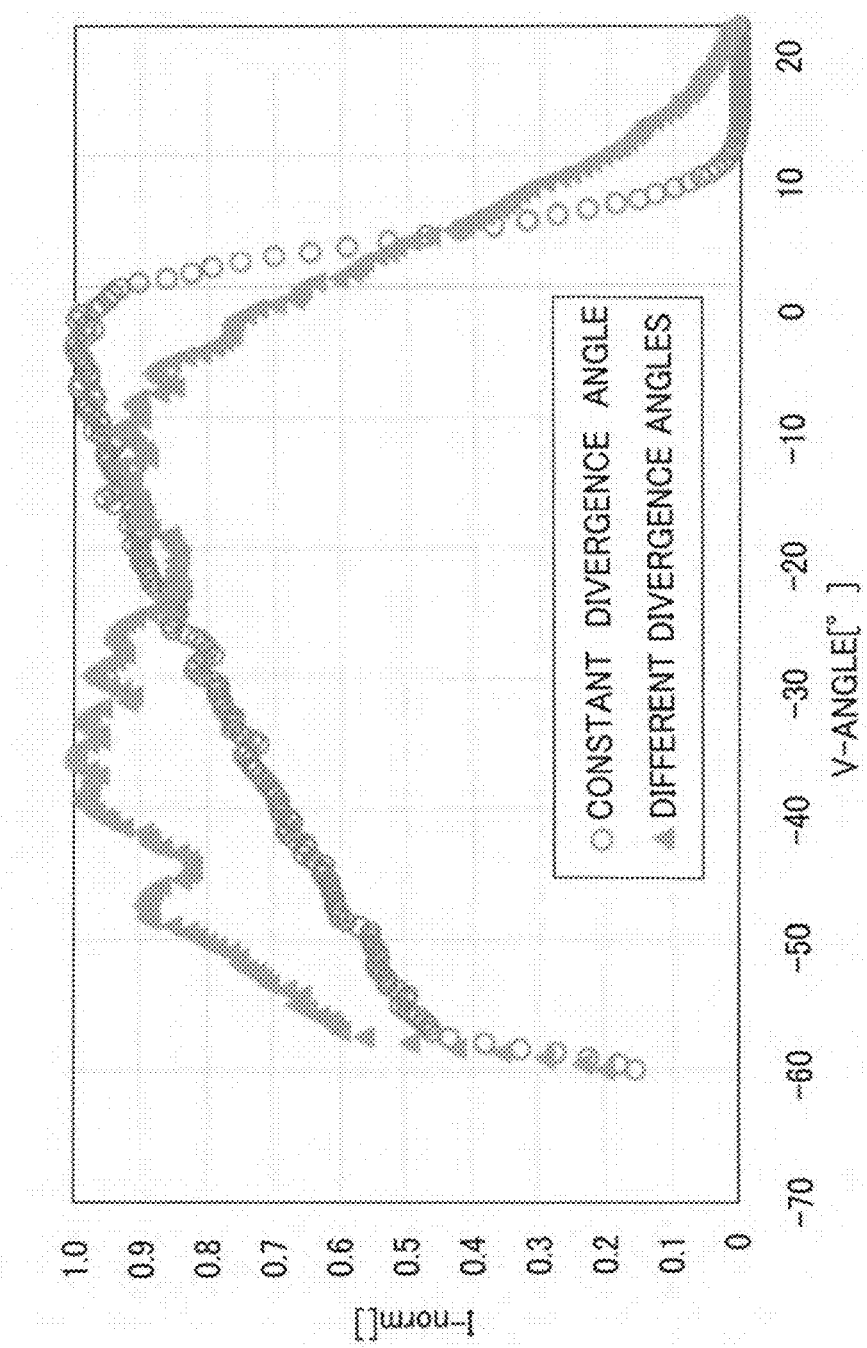
FIG. 17 is a graph of the simulation results for the superiority of the light-source device, according to still another embodiment.

FIG. 17 is a graph of a comparison between the example of FIG. 16A (the divergence angle is the same between the microlenses for the light emitters 1 to 7) and the example of FIG. 16B (the microlenses for the light emitter 1 to 7 have it divergence angles) with normalized illuminances of the irradiated surface with respect to the angle directions. In FIG. 17, the horizontal axis represents the vertical angle, and the vertical axis represents the illuminance ratio.

As is clear from FIG. 17, the uniformity of illuminance from the central portion to the peripheral portion of the irradiated surface is higher for the case where the microlenses have different divergence angles than for the case where the divergence angle of the microlenses is constant. For example, when the angle of the central portion in the vertical direction is 0°, the width at which 80% or more of the peak intensity of light is obtained is 27.4° for a half angle when the divergence angle of the microlens is constant, and is 50.2° when the microlenses have different divergence angles is changed is 50.2°.

Application examples in which the light-source device 11 described above is used in various electronic apparatuses are described referring to FIGS. 18 to 22. In a detection device 50 used in the application examples, the blocks to be described be correspond to the signal control circuit 17 of the range finder 10 in FIG. 1, and the other configurations are the same as those of the range finder 10. In the detection device 50, the photosensor 13 in FIG. 1 is a sensor configured to detect light that has been emitted from the light-source device 11 and reflected by the object 12 to be detected. In FIGS. 18 to 22, functional blocks such as a determination unit included in the detection device 50 are illustrated outside the detection device 50 for convenience of drawing. In various electronic apparatuses illustrated in FIGS. 18 to 22, the detection device 50 receives information, and a controller controls the electronic apparatus based on the information from the detection device 50.

Figure 18:
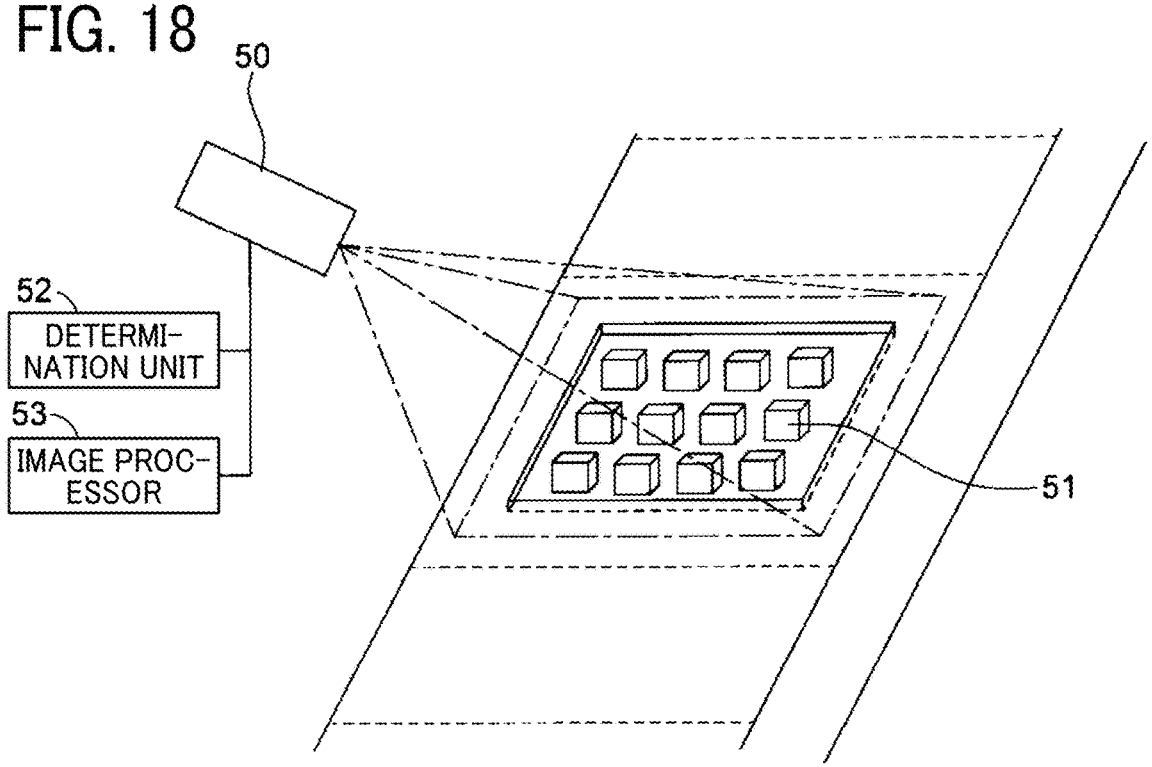
FIG. 18 is an illustration of a detection device for inspecting articles, to which the light-source device is applied.

FIG. 18 is an application example in which the detection device 50 is used for inspecting articles in factories. The light-source 11 of the detection device 50 emits light to an irradiation area that covers a plurality of articles 51, and the sensor (the photosensor 13) receives light reflected from the articles. Based on the information detected by the sensor, a determination unit 52 determines the state of each article 51. Specifically, based on the electric signal photoelectrically converted by the photosensor 13, the image processor 53 generates image data (image information of the irradiated area that is irradiated with the light from the light-source device 11), and the determination unit 52 determines the state of each article 51 based on the generated image information. In other words, the light receiving optical system 18 and the photosensor 13 of the detection device 50 serve to capture an image of the projection area to which the light emitted from the light-source device 11 is projected. The determination unit 52 determines the state of each article 51 based on the captured image information by image analysis such as pattern matching.

In, the application example of FIG. 18, the detection device 50 (the light-source device 11) that achieves a uniform illuminance across the irradiated area is used so as to reduce or prevent the variations in the illuminance on the irradiated area that is irradiated with a wide-angle laser beam. This configuration achieves an accurate inspection of many articles 51, which further increases the inspection work efficiency. Further, the detection device 50 that performs the TOF detection enables information in the front of each article 51 (the side facing the detection device 50) and information in the depth direction of each article 51 to be obtained. This configuration enables fine scratches, defects, and three-dimensional shapes of the article 51 to be more easily recognized than the image-capturing device for appearance inspection. This improves the inspection accuracy more. Moreover, as the irradiation area that covers the articles 51 to be detected is irradiated with light emitted from the light-source device 11 of the detection device 50, the detection device 50 is usable in a dark environment.

Figure 19:
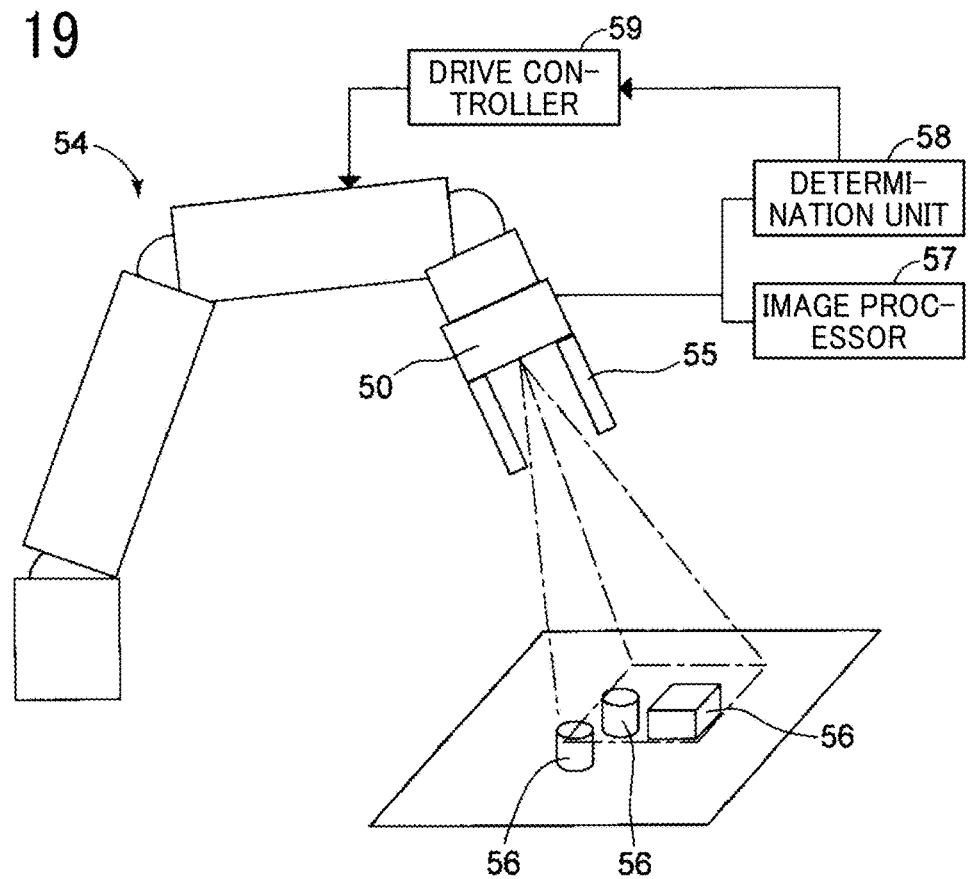
FIG. 19 is an illustration of a movable apparatus to which the detection device provided with the source device is applied.

FIG. 19 an illustration of a movable apparatus to which the detection device 50 provided with the source device is applied. An articulated arm 54 is a movable apparatus. The articulated arm 54 includes a plurality of arms coupled by a bendable joint, and a hand portion 55 provided at a distal end thereof. The articulated arm 54 is used, for example, in an assembly line of a factory, and grips an object 56 by the hand portion 55 during inspection, conveyance, and assembly of the object 56.

The detection device 50 is mounted at a position closest to the hand portion 55 of the articulated arm 54. The detection device 50 is provided so that a direction of emitted light coincides with a direction in which the hand portion 55 faces, and detects the object 56 and the peripheral region thereof as an object to be detected. The photosensor 13 of the detection device 50 receives light reflected from the irradiated area that includes the object 56, and the image processor 57 generates image data (captures an image). The determination unit 58 determines various information regarding the object 56 based on the obtained image information. Specifically, information detected using the detection device 50 includes a distance to the object 56, a shape of the object 56, a position of the object 56, and if a plurality of objects 56 are present, relative positions oaf the objects 56. Then, based on the determination result in the determination unit 58, drive controller 59 controls the operation of the articulated arm 54 and the hand portion 55 to grip or move the object 56.

In the application example of FIG. 19, the detection device 50 in FIG. 1 exhibits the same advantageous effects (e.g., the improvement in the accuracy of the detection) as the detection device 50 in FIG. 18 to detect the object 56. Moreover, since the detection device 50 is mounted on the articulated arm 54 (in particular, at a post ion closest to the hand portion 55), the object 56 which is an object to be gripped can be detected from a short distance, and detection accuracy and recognition accuracy can be improved as compared with detection by a far detection device arranged at a position distant from the articulated arm 54.

Figure 20:
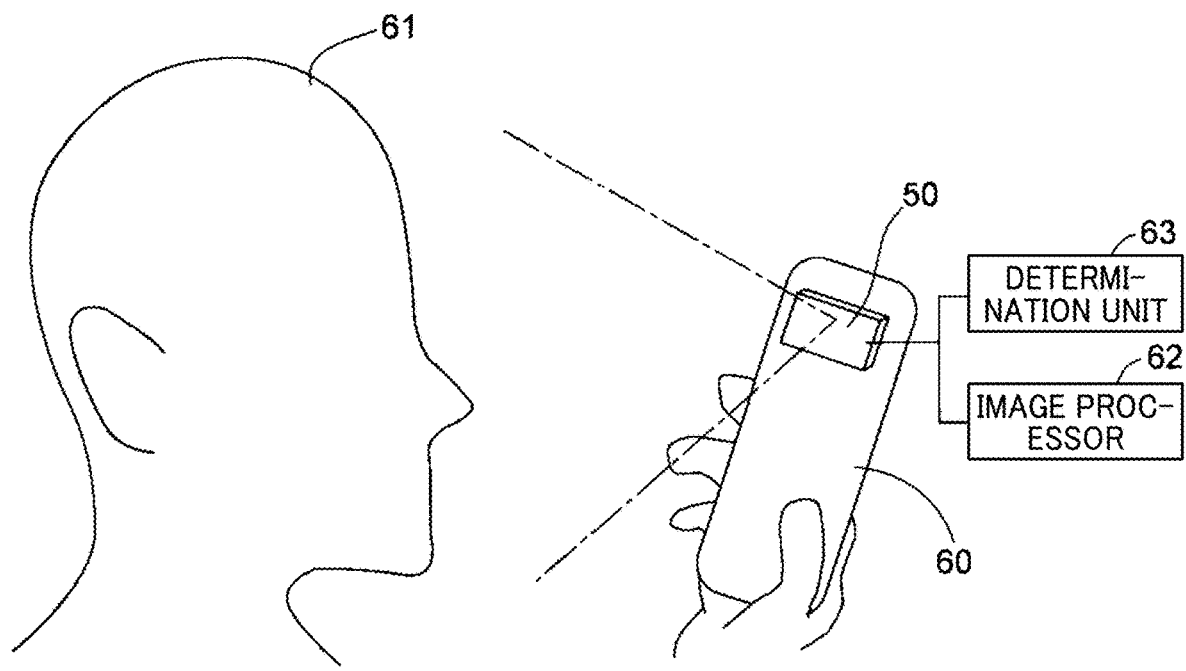
FIG. 20 is an illustration of a mobile information terminal to which the detection device provided with the light-source device is applied.

FIG. 20 is an application example in which the detection device 50 is used for user authentication of an electronic device. A portable information terminal 60 which is an electronic apparatus has an authentication function for a user. The authentication function may be implemented by dedicated hardware or may be implemented by execution of a program by a central processing unit (CPU) that controls the portable information terminal 60. The program may be stored in a memory such as a read only memory (ROM).

To authenticate a user light is projected from the light-source device 11 of the detection device 50 mounted on the portable information terminal 60 to a user 61 using the portable information terminal 60. The photosensor 13 of the detection device 50 receives light reflected from the user 61 and its surroundings, and the image processor 62 generates image data (captures an image). A determination unit 63 determines the matching degree between image information obtained by image capturing the user 61 using the detection device 50 and user information registered in advance, and determines whether the user is the registered user. Specifically, the shape (contour or unevenness) of the face, ears, or head of the user 61 is measured and used as user information.

In the application example of FIG. 20, the detection device 50 in FIG. 20 exhibits the same advantageous effects (e.g., the improvement in the accuracy of the detection) as the detection device 50 in FIG. 18 to detect the user 61. In particular, as a wide range is irradiated with a laser beam with a wide angle and a uniform irradiation intensity emitted from the light-source device 11 to detect information on the user 61, more amount of information for recognizing the user is obtained than a narrower detection range does. This configuration improves the accuracy of recognition.

FIG. 20 is an illustration of the example in which the detection device 50 is mounted on the portable information terminal 60; however, the user authentication using the detection device 50 may be used for a stationary personal computer, an office automation (OA) appliance such as a printer, a security system of a building, or the like. Moreover, the function to be used is not limited to the authentication function for an, individual, and may be used for scanning a three-dimensional shape such as a face. Even in this case, mounting the detection device 50 (the light-source device 11) that emits a laser beam with a wide angle and a uniform irradiation intensity can provide scanning with high accuracy.

Figure 21:
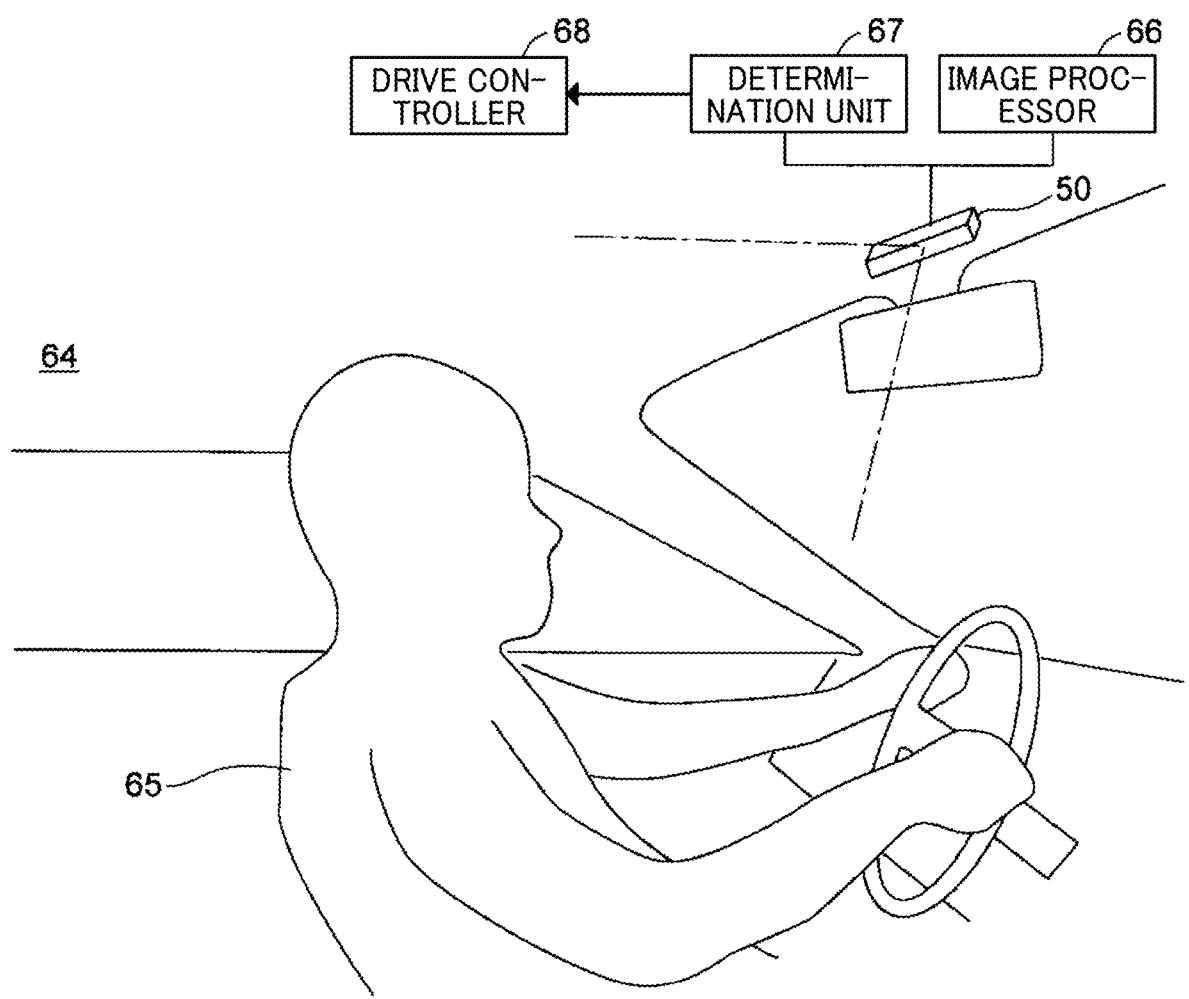
FIG. 21 is an illustration of a mobile driver-assistance system to which the detection device provided with the light-source device is applied.

FIG. 21 is an illustration of an application example in which a detection device 50 is used in a driving assistance system of a mobile body such as an automobile. An automobile 64 has a driving assistance function that can automatically perform part of a driving operation, such as deceleration or steering. The driving assistance function may be implemented by dedicated hardware or may be implemented by execution of a program by an electronic control unit (ECU) that controls an electronic system of the automobile 64. The program may be stored in a memory such as a ROM.

The light-source device 11 of the detection device 50 mounted in the automobile 64 projects light to a driver 65 who drives the automobile 64. The photosensor 13 of the detection device 50 receives light reflected from the driver 65 and its surroundings, and the image processor 66 generates image data (captures an image). A determination unit 67 determines information such as a face (facial expression) and a posture of the driver 65 based on image information obtained by image capturing the driver 65. Based on the determination result of the determination unit 67, a driving controller 68 controls the brake and the steering wheel to perform appropriate driving assistance in accordance with the situation of the driver 65. For example, control on automatic deceleration or automatic stop can be performed when look-aside driving or falling-asleep driving is detected.

In the application example of FIG. 21, the detection device 50 in FIG. 21 exhibits the same advantageous effects (e.g., the improvement in the accuracy of the detection) as the detection device 50 in FIG. 18 to detect the driver 65. In particular, as a wide range is irradiated with a laser beam with a wide angle and a uniform irradiation intensity emitted from the light-source device 11 to detect information on the driver 65, more amount of information for recognizing the driver is obtained than a narrower detection range does. This configuration improves the accuracy of driving assistance.

FIG. 21 is an illustration of the example in which the detection device 50 is mounted on the automobile 64; however, the detection device 50 can be applied to a train, an aircraft, or the like, as a mobile body other than an automobile. In addition to detecting the face and posture of a driver or a manipulator of a mobile body, the detection target can also be the state of a passenger in a passenger seat or the condition in a vehicle other than the passenger seat. Similarly to the application example of FIG. 20, the function can be used for personal authentication for a driver. For example, the driver 65 is detected using the detection device 50 to permit the start of the engine when driver information matches driver information registered in advance, or to permit locking and unlocking of the door lock.

Figure 22:
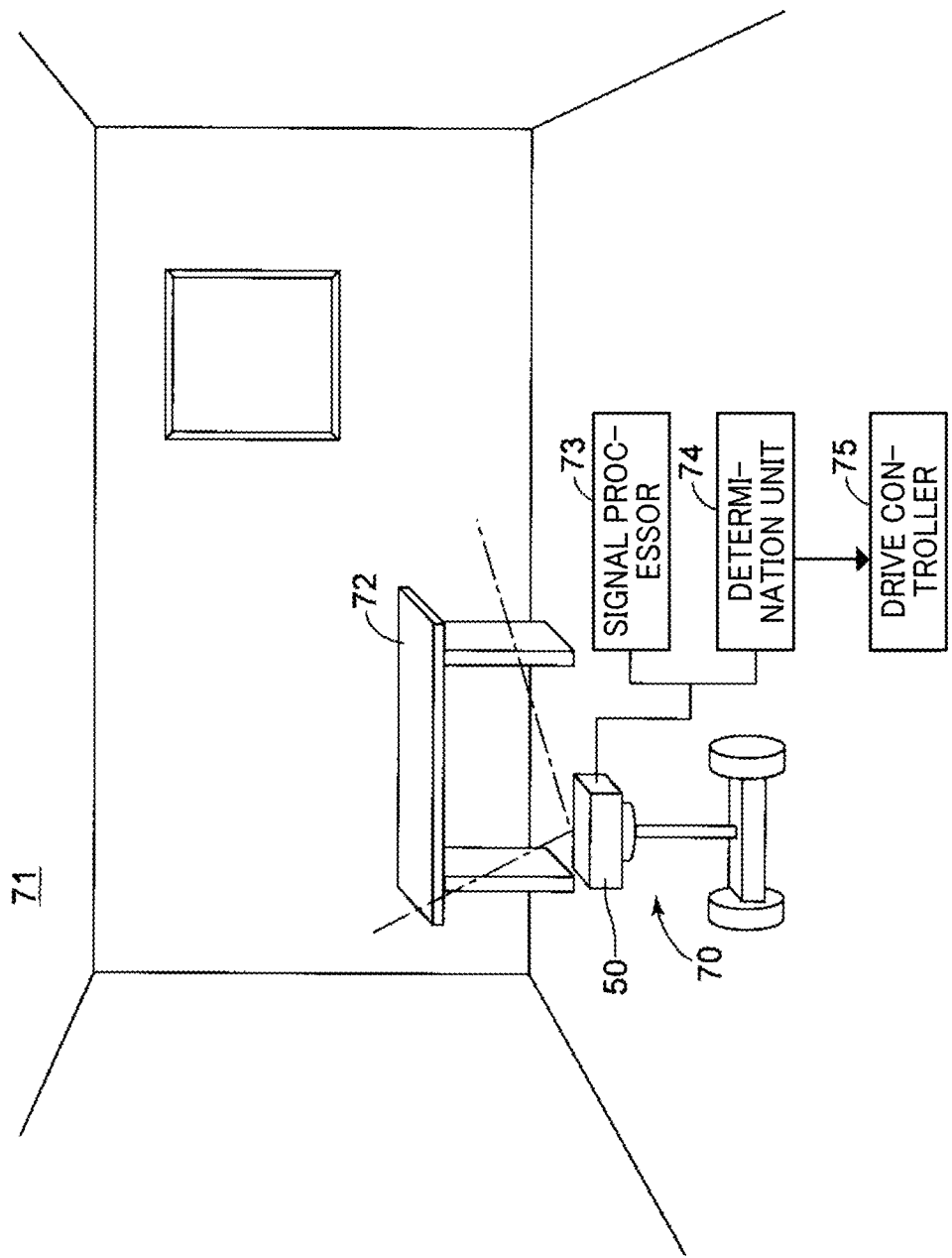
FIG. 22 is an illustration of a mobile autonomous traveling system to which the detection device provided with the light-source device is applied.

FIG. 22 is an illustration of an application example in which a detection device 50 is used in an autonomous traveling system in a mobile body. Unlike the application example of 21, in the application example of FIG. 22, the detection device 50 is used for sensing an object outside a mobile body 70. The mobile body 70 is an autonomous traveling mobile body capable of traveling automatically while recognizing an external situation.

The detection device 50 is mounted on the mobile body 70. The detection device 50 emits light in a traveling, direction of the mobile body 70 and the peripheral region thereof. In a room 71 which is a moving area of the mobile body 70, a desk 72 is placed in the traveling direction of the mobile body 70. The photosensor 13 of the detection device 50 receives and photoelectrically converts light which is included in light projected from the light-source device 11 of the detection device 50 mounted on the mobile body 70 and which is reflected from the desk 72 and the periphery thereof, and transmits the photoelectrically converted electric signal to the signal processor 73. Based on the electric signal transmitted from the photosensor 13, the signal processor 73 calculates information about the layout of the room 71, such as the distance to the desk 72, the position of the desk 72, and the surrounding condition other than the desk 72. Based on the calculated information, a determination unit 74 determines the moving path and the moving speed of the mobile body 70, and a drive controller 75 controls the traveling of the mobile body 70 (operation of the motor as a drive source, etc.) based on the determination result of the determination unit 74.

In the application example of FIG. 22, the detection device 50 in FIG. 22 exhibits the same advantageous effects (e.g., the improvement in the accuracy of the detection) as the detection device 50 in FIG. 18 to detect layout in the interior of the room 71. In particular, as a wide range is irradiated with a laser beam with a wide angle and a uniform irradiation intensity emitted from the light-source device 11 to detect information on the interior of the room 71, more amount of information for recognizing the driver is obtained than a narrower detection range does. This configuration improves the accuracy of autonomous traveling of the mobile body 70.

FIG. 22 is an illustration of the example in which the detection device 50 is mounted on the autonomous traveling mobile body 70 that travels in the room 71; however, it can also be applied to an autonomous traveling vehicle (so-called automatic driving vehicle) that travels outdoors. Alternatively, the detection device 50 can be applied to the driving assistance system in a mobile body such as an automobile that a driver drives rather than autonomous traveling. In this case, the detection device 50 can be used to detect the surrounding condition of the mobile body, and to assist the driving of the driver in accordance with the detected surrounding condition.

The present disclosure is not limited to the above-described embodiments and variations, and numerous additional and variations are possible in light of the above teachings.

In the above-described embodiments, the VCSEL is used as the plurality of light emitters. However, no limitation is not intended therein, and laser diodes (LDs) or light-emitting diodes (LEDs) may be used as the plurality of light emitters. Alternatively, edge emitting laser may be used as the plurality of light emitters. Further, the light source may be a single light source or a plurality of light sources that emit laser beams simultaneously (for example, a VCSEL array light source). The VCSEL is advantageous in terms of easiness of providing a two-dimensional light emitting region and a high degree of flexibility in arrangement of a plurality of light emitting regions. For example, in a VCSEL, it is easy to arrange a large number of light emitters in the same plane, and the VCSEL can be made smaller and thinner than the case in which edge emitting LDs are arranged. Even when a light source other than the VCSEL is used, the same advantageous effect as the above-described embodiments can be exhibited by setting the arrangement of the plurality of light-emitting elements and the relative positions between each light emitting element and the microlens array.

In the above-described embodiments, a surface-emitting laser is used in which a plurality of surface-emitting laser elements is arranged as the plurality of light emitters in the horizontal direction and the vertical direction so as to enables a surface as a whole to emit laser beams. Alternatively, a linear light source may be used in which a light-emitting region is linearly arranged in a prescribed direction, such as the horizontal direction or the vertical direction.

In the above-described embodiments, a plurality of microlenses is used as a plurality of optical elements. However, no limitation is intended therein. The plurality of optical elements may be any component that enables the divergence angles of laser beams emitted from the plurality of light emitters to be changed, and various design changes can be made.

In the above-described embodiments, the laser beams emitted from the plurality of surface-emitting laser elements 21 are assumed to have the same light intensity (irradiation intensity, output power). Alternatively, the laser beams emitted from the plurality of surface-emitting laser elements 21 may have different light intensities (irradiation intensity, output power). For example, the intensity of light per unit area of a light emitting region of a surface-emitting laser element 21 corresponding to an irradiated area for which the magnification power of the projection optical system 15 is relatively large may be larger than the intensity of light per unit area of a light emitting region of a surface-emitting laser element 21 corresponding to an irradiated area for which the magnification power of the projection optical system 15 is relatively small.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC). DSP (digital signal processor), FPGA (field programmable gate array) and conventional circuit components arranged to perform the recited functions.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims,

What is claimed is:

1. A light-source device comprising:
a plurality of light emitters; and
a plurality of optical elements through which laser beams emitted from the plurality of light emitters pass,
the plurality of optical elements including:
a plurality of first optical elements each to emit a laser beam of a first divergence angle; and
a plurality of second optical elements each to emit a laser beam of a second divergence angle smaller than the first divergence angle,
wherein the plurality of first optical elements is disposed closer to a center of the plurality of optical elements than the plurality of second optical elements, and divergence angles of the plurality of optical elements vary monotonically from an optical element at the center of the plurality of optical elements to an optical element at an edge of the plurality of optical elements,
the plurality of optical elements constitutes a single integrated optical element array,
the plurality of first optical elements forms a two-dimensional array,
the plurality of second optical elements forms another two-dimensional array, and
the another two-dimensional array of the plurality of second optical elements is disposed outside the two-dimensional array of the plurality of first optical elements away from the center of the plurality of optical elements.

2. The light-source device according to claim 1,
wherein one of the plurality of first optical elements and one of the plurality of second optical elements each have at least one of:
an optical surface of a different shape; and
a different refractive index.

3. The light-source device according to claim 1,
wherein one of the plurality of first optical elements and one of the plurality of second optical elements each have an optical surface of a different shape and a different refractive index.

4. The light-source device according to claim 1, further comprising a projection optical system configured to project the laser beams that have been emitted from the plurality of light emitters and passed through the plurality of optical elements onto an irradiated area,
wherein the projection optical system projects the laser beams that have been passed through the plurality of first optical elements onto a first irradiated area with a first magnification power, and
wherein the projection optical system projects the laser beams that have been passed through the plurality of second optical elements onto a second irradiated area with a second magnification power larger than the first magnification power.

5. The light-source device according to claim 4,
wherein the first irradiated area is a central portion of the irradiated area,
wherein the second irradiated area is a peripheral portion of the irradiated area.

6. The light-source device according to claim 1,
wherein one of the plurality of first optical elements has a convex optical surface with a first curvature, and
wherein one of the plurality of second optical elements has a convex optical surface with a second curvature larger than the first curvature.

7. The light-source device according to claim 1,
wherein one of the plurality of first optical elements has a concave optical surface with a first curvature, and
wherein one of the plurality of second optical elements has a concave optical surface with a second curvature smaller than the first curvature.

8. The light-source device according to claim 1,
wherein one of the plurality of first optical elements has a first refractive index, and
wherein one of the plurality of second optical elements has a second refractive index larger than the first refractive index.

9. The light-source device according to claim 1,
wherein the plurality of optical elements is on the plurality of light emitters.

10. The light-source device according to claim 1, further comprising a substrate between the plurality of optical elements and the plurality of light emitters,
wherein the plurality of optical elements is on the substrate.

11. The light-source device according to claim 1,
wherein the plurality of light emitters includes a vertical cavity surface emitting laser, a laser diode, or a light emitting diode.

12. A detection device comprising:
the light-source device according to claim 1; and a sensor to detect light that has been emitted from the light-source device and reflected from an object.

13. The detection device according to claim 12, further comprising a calculator to obtain information about a distance to the object based on a signal output from the sensor.

14. An electronic apparatus comprising:
the detection device according to claim 12; and
circuitry configured to control the electronic apparatus based on information output from the detection device.

15. The light-source device according to claim 1, wherein the plurality of light emitters are disposed on axes of the plurality of optical elements, respectively.

16. The light source device according to claim 1,
wherein at least two of the plurality of second optical elements are adjacent to one of the plurality of first optical elements.

17. The light source device according to claim 1,
wherein, in the two-dimensional array, at least two of the plurality of first optical elements are adjacent to each other in a first direction and at least another two of the plurality of first optical elements are adjacent to each other in a second direction, the first direction being perpendicular to the second direction.

* * * * *